US011422225B2

(12) United States Patent
Lee et al.

(10) Patent No.: US 11,422,225 B2
(45) Date of Patent: Aug. 23, 2022

(54) INTEGRATED LOCALIZATION METHOD AND APPARATUS OF HIGH ACCURACY ROBUST TO ROUTE CHANGE

(71) Applicant: KOREA INSTITUTE OF SCIENCE AND TECHNOLOGY, Seoul (KR)

(72) Inventors: Taikjin Lee, Seoul (KR); Chulki Kim, Seoul (KR); Yongsang Ryu, Seoul (KR); Beomju Shin, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 512 days.

(21) Appl. No.: 16/477,458

(22) PCT Filed: Dec. 28, 2017

(86) PCT No.: PCT/KR2017/015650
§ 371 (c)(1),
(2) Date: Jul. 11, 2019

(87) PCT Pub. No.: WO2018/139772
PCT Pub. Date: Aug. 2, 2018

(65) Prior Publication Data
US 2019/0383922 A1     Dec. 19, 2019

(30) Foreign Application Priority Data

Jan. 25, 2017   (KR) .................. 10-2017-0011988
Sep. 26, 2017   (KR) .................. 10-2017-0124038

(51) Int. Cl.
*G01S 5/14*      (2006.01)
*H04W 4/029*     (2018.01)
(Continued)

(52) U.S. Cl.
CPC .............. *G01S 5/14* (2013.01); *G01C 21/206* (2013.01); *G01S 5/0081* (2013.01);
(Continued)

(58) Field of Classification Search
CPC ........ G01S 5/14; G01S 5/0284; G01S 5/0221; G01S 11/06; G01S 19/01
(Continued)

(56) References Cited

U.S. PATENT DOCUMENTS

2017/0142555 A1*  5/2017  Ljung .................. H04W 4/026

FOREIGN PATENT DOCUMENTS

KR   10-2016-0035637 A   4/2016
WO   WO 2015/194771 A1   12/2015

OTHER PUBLICATIONS

Korean Office Action dated Aug. 8, 2018 in counterpart Korean Patent Application No. 10-2017-0124038 (5 pages, in Korean).
(Continued)

*Primary Examiner* — Bo Fan
(74) *Attorney, Agent, or Firm* — NSIP Law

(57) ABSTRACT

The present invention relates to integrated localization method and apparatus of high accuracy, and estimates a relative position of a moving node, based on motion sensing of the moving node, estimates an absolute position of the moving node, based on a change pattern of at least one signal strength received from at least one fixed node over a plurality of time points, calculates accuracy of the absolute position of the moving node that changes along a movement route of the moving node, and determines a current position of the moving node from at least one of the relative position and the absolute position estimated as such in accordance with the accuracy of the absolute position of the moving node. Accordingly, it is possible to accurately estimate a position of a moving node using a radio signal which not only accurately estimates the position of the moving node even in a change of wireless environment or various route changes but also has almost no change in signal strength over a wide region.

17 Claims, 12 Drawing Sheets

(51) Int. Cl.
  *G01S 5/00*    (2006.01)
  *G01S 5/02*    (2010.01)
  *G01S 11/06*   (2006.01)
  *G01S 19/01*   (2010.01)
  *H04W 88/18*   (2009.01)
  *G01C 21/20*   (2006.01)

(52) U.S. Cl.
  CPC .......... *G01S 5/0221* (2013.01); *G01S 5/0284* (2013.01); *G01S 11/06* (2013.01); *G01S 19/01* (2013.01); *H04W 4/029* (2018.02); *H04W 88/18* (2013.01)

(58) Field of Classification Search
  USPC ........................................ 342/146, 125, 175
  See application file for complete search history.

(56) References Cited

OTHER PUBLICATIONS

International Search Report dated Aug. 10, 2018 in counterpart International Application No. PCT/KR2017/015650 (5 pages, in Korean with English translation).

\* cited by examiner

|  | RL1 | RL2 | RL3 | ... | RLn |
|---|---|---|---|---|---|
| AP1 | $RSS_{11}$ | $RSS_{12}$ | $RSS_{13}$ | ... | $RSS_{1n}$ |
| AP2 | $RSS_{21}$ | $RSS_{22}$ | $RSS_{23}$ | ... | $RSS_{2n}$ |
| AP3 | $RSS_{31}$ | $RSS_{32}$ | $RSS_{33}$ | ... | $RSS_{3n}$ |
| ... | ... | ... | ... | ... | ... |
| APm | $RSS_{m1}$ | $RSS_{m2}$ | $RSS_{m3}$ | ... | $RSS_{mn}$ |

(a)

|  | AL1 | AL2 | AL3 | ... | ALn |
|---|---|---|---|---|---|
| AP1 | -41 | -48 | -51 | ... | -63 |
| AP2 | -49 | -46 | -44 | ... | -66 |
| AP3 | -45 | -47 | -50 | ... | -64 |
| ... | ... | ... | ... | ... | ... |
| APm | -47 | -50 | -53 | ... | -65 |

(b)

Fig. 9
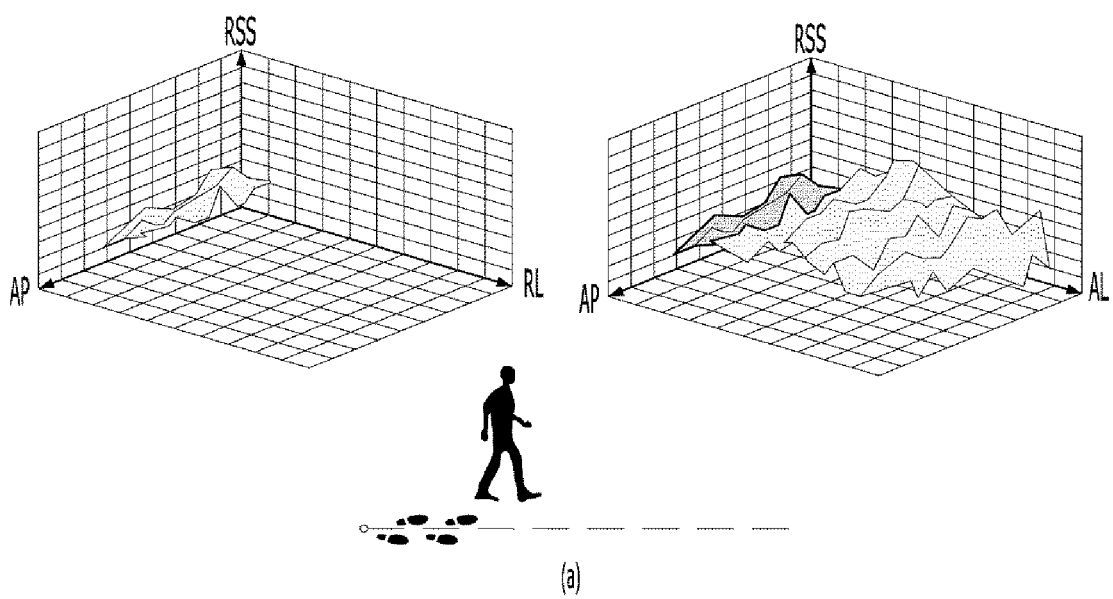
(a)
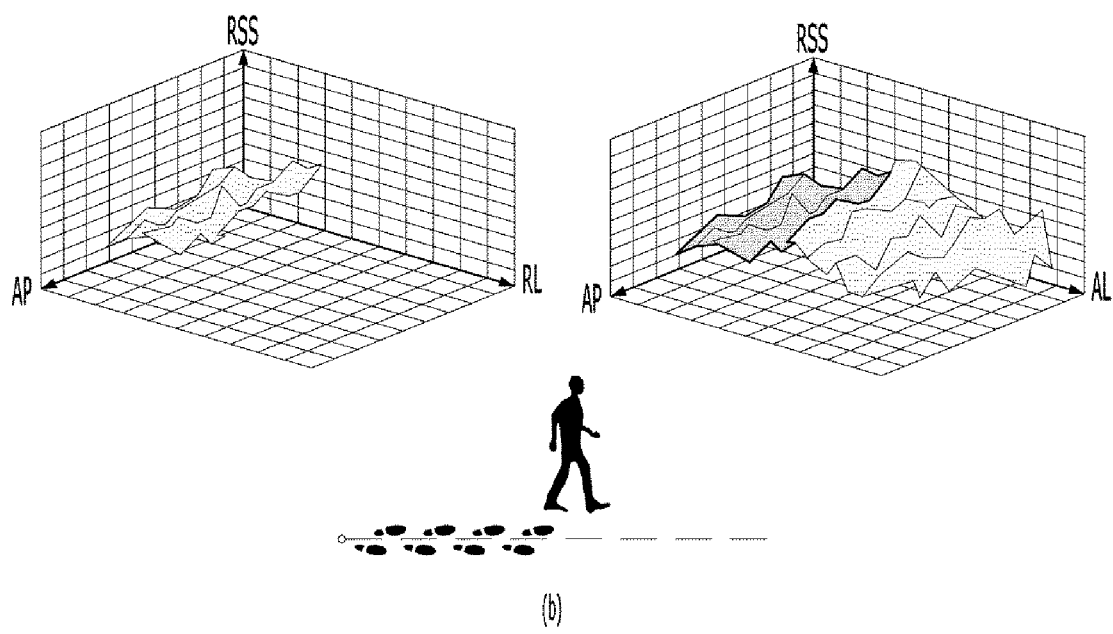
(b)

Fig. 10
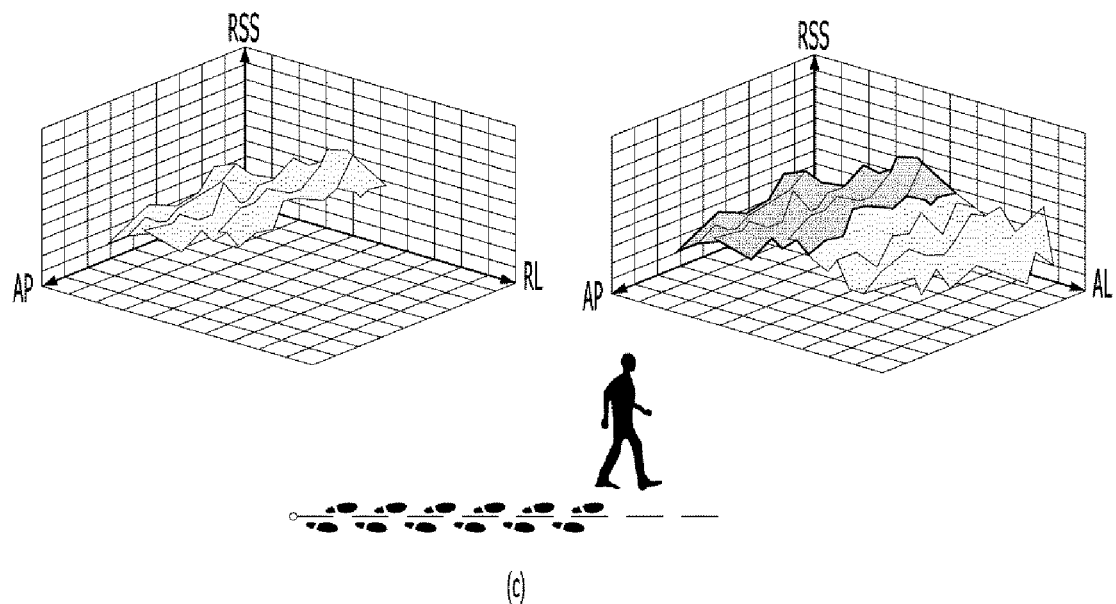
(c)
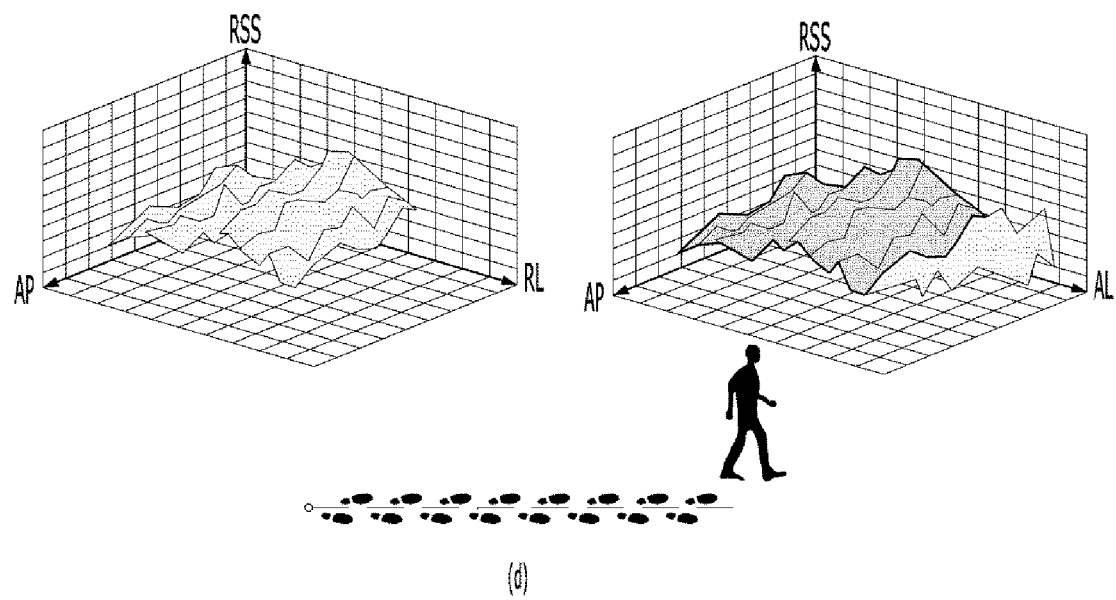
(d)

Fig. 11
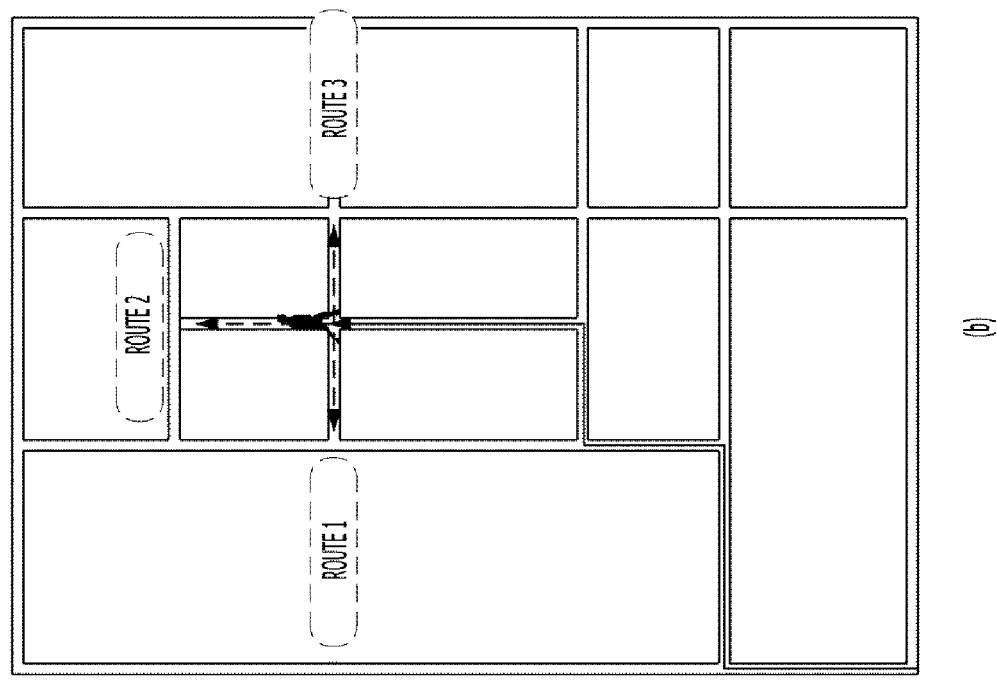
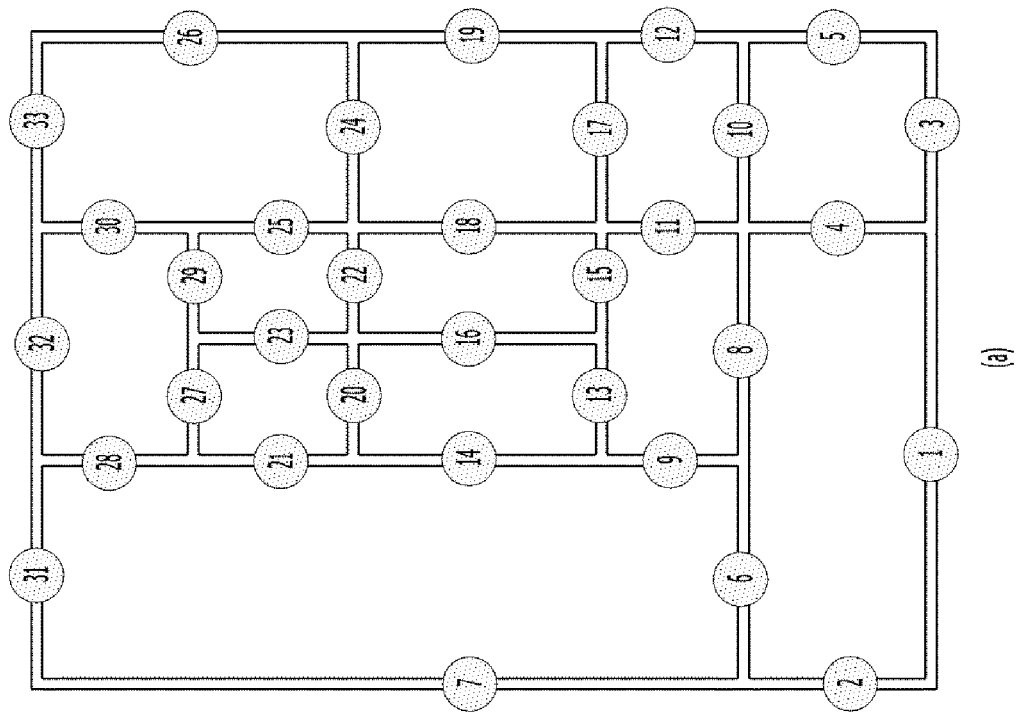

INTEGRATED LOCALIZATION METHOD AND APPARATUS OF HIGH ACCURACY ROBUST TO ROUTE CHANGE

CROSS REFERENCE TO RELATED APPLICATIONS

This application is a U.S. National Stage Application of International Application No. PCT/KR2017/015650, filed on Dec. 28, 2017, which claims the benefit under 35 USC 119(a) and 365(b) of Korean Patent Application No. 10-2017-0011988, filed on Jan. 25, 2017 and Korean Patent Application No. 10-2017-0124038, filed on Sep. 26, 2017, in the Korean Intellectual Property Office, the entire disclosures of which are incorporated herein by reference for all purposes.

TECHNICAL FIELD

The present invention relates to integrated localization method and apparatus which can more accurately estimate a position of a moving node by integrating heterogeneous localization algorithms that estimate the position of the moving node using different techniques, as compared with a single localization algorithm.

BACKGROUND ART

A global navigation satellite system (GNSS) is a system for estimating positions of moving objects moving all over the earth using a radio wave emitted from a satellite orbiting a space orbit and is widely used for a military purpose such as missile guidance, for tracking a position of a smartphone user, and for a navigation system of a vehicle, a ship, an aircraft, and the like nowadays. Representative examples of the GNSS include a global positioning system (GPS) of the United States, a GLONASS of Russia, Galileo of Europe, a quasi-zenith satellite system (QZSS) of Japan, and the like. However, the GNSS cannot perform a localization in an indoor space where a radio wave emitted from a satellite cannot reach, and has a problem that localization accuracy is significantly decreased in the center of a city due to blocking, reflection, and the like of the radio wave by skyscrapers.

In recent years, automobile manufacturers around the world, and global corporations such as Google and Intel have fostered research and development of an autonomous vehicle. However, partial autonomous driving in an outdoor space makes some results, but autonomous driving in the indoor space and the outdoor space is still impossible due to inability of an indoor localization of the GNSS. In order to solve the problem of the GNSS, a wireless localization technique for estimating a position of a user or a vehicle using a radio signal existing in an indoor space draws much attention. The wireless localization technology is currently being commercialized and serviced, but localization accuracy is very low compared with the GNSS, and thus, various types of wireless localization technology are under development.

Wireless communication can be classified into short-range wireless communication and wide-area wireless communication. A representative example of the short-range wireless communication includes Wi-Fi, Bluetooth, Zigbee, and the like, and a representative example of the wide-area wireless communication includes 3rd generation (3G), 4th generation (4G), Lora, and the like. The long term evolution (LTE) is a kind of 4G wireless communication. The short-range wireless communication such as Bluetooth and Zig-Bee is not suitable for a localization because of characteristics that temporarily occur in an indoor space according to needs of a user and disappear. Currently, a Wi-Fi signal and an LTE signal are known to be distributed in most indoor spaces.

Accordingly, a WiFi position system (WPS) that performs a localization using a Wi-Fi signal of a band of 2.4 GHz is in the spotlight. A representative localization technique which uses the WiFi signal may include a triangulation technique and a fingerprint technique. The triangulation technique estimates a position by measuring a received signal strength (RSS) from three or more access points (APs) and converting the received signal strength into a distance. However, since attenuation, reflection, diffraction, or the like of a radio signal occurs due to a wall of a building, an obstacle, people, and the like in an indoor space, the converted distance value includes a large error, and thereby, the triangulation technique is rarely used for an indoor localization.

For this reason, the fingerprint technique is mainly used in the indoor space. This technique divides the indoor space into a grid structure, collects values of signal strength in each unit area, and builds a radio map by storing the values in a database. In a state where the radio map is built as described above, a position of a user is estimated by comparing strength of the signal received at the position of the user with data of the radio map. Since the technique collects data in which spatial characteristics of the indoor space is reflected, the technique has an advantage that localization accuracy is higher than the triangulation technique. As wireless environment is good and many signals are collected by finely dividing the indoor space, the localization precision may be increased up to 2 to 3 meters.

The fingerprint technique performs relatively accurate localization in a case where there is little difference between strength of a signal collected at the time of building a radio map and strength of a signal collected at the time of localization. However, a change in the wireless environment, such as a signal interference between communication channels frequently occurring in the real world, expansion of an access point, occurrence of failure or an obstacle, and the like leads to collection of signal strength different from data of a radio map built in the past, which results in a serious impact on localization accuracy. Accordingly, various attempts have been made to increase the localization accuracy by applying a k-nearest neighbor (KNN), a particle filter or the like to the fingerprint technique.

First of all, due to the fact that a Wi-Fi signal is distributed actually only in a part of the center of a city due to characteristic of short-range wireless communication, the fingerprint technique has an inherent limitation that cannot be used alone for a vehicle navigation system requiring a localization service in both an indoor space and an outdoor space, or autonomous driving. The LTE signal is uniformly distributed in the indoor space and the outdoor space, but there is a limitation to increase a localization accuracy because an area where a change in the signal strength is not large is wide. As a result, the localization service which uses the LTE signal remains at a level in which an approximate position of a user is provided, and there are still many problems to be used for a vehicle navigation system or autonomous driving in which a localization error can lead to an accident.

DISCLOSURE

Technical Problem

There is provided integrated localization method and apparatus of high accuracy which can estimate a position of a moving node of high accuracy even in a case where the position of the moving node is estimated by using a radio signal that not only can estimate the position of the moving node of high accuracy even in a change of wireless environment but also has almost no change in signal strength over a wide region and which is robust to a route change. In addition, there is provided a computer-readable recording medium in which a program for causing a computer to execute the above-described integrated localization method is recorded. The present invention is not limited to the above-described technical problems as described above, and another technical problem may be derived from the following description.

Technical Solution

An integrated localization method according to one aspect of the present invention includes estimating a relative position of a moving node, based on motion sensing of the moving node; estimating an absolute position of the moving node, based on a change pattern of at least one signal strength received from at least one fixed node over a plurality of time points; calculating accuracy of the absolute position of the moving node that changes along a movement route of the moving node; and determining a current position of the moving node from at least one of the estimated relative position and the estimated absolute position in accordance with the accuracy of the calculated absolute position.

The change pattern of the at least one signal strength may be a change pattern of at least one signal strength that is represented as continuous arrangement of at least one signal strength which is received a plurality of times at a plurality of relative positions of the moving node that are estimated at the plurality of time points. The estimating of the absolute position may estimate the absolute position of the moving node, based on a comparison between the change pattern of the at least one signal strength with a map of a distribution pattern shape of signal strength in a region where the moving node is located, and the determining of the current position may calculate similarity between the change pattern of the at least one signal strength and a corresponding pattern in the map as the accuracy of the absolute position.

The estimating of the absolute position may estimate the absolute position of the moving node by searching, within the map, a surface part having a shape most similar to a pattern of a geometric surface shape graphically representing a change of at least one signal strength according to a relative change of a position of the moving node, and the calculating of the accuracy may calculate the accuracy of the absolute position by calculating a shape similarity between the pattern of the surface shape and the searched surface part.

The estimating of the absolute position may search a surface part having a shape most similar to the surface shape within the map by comparing the pattern of the surface shape with the map and may estimate an absolute position of the map indicated by the searched surface part as the absolute position of the moving node. The generating of the change pattern of the at least one signal strength may generate the pattern of the geometric surface shape in such a manner that a dot is marked on a point of multidimensional space that is determined by mapping an ID of a certain fixed node on a first coordinate axis of the multidimensional space, mapping the relative position of the moving node on a second coordinate axis, and mapping strength of a signal that is transmitted from the certain fixed node on a third coordinate axis.

The determining of the current position may determine the current position of the moving node in such a manner that a weight of the estimated absolute position and a weight of the estimated relative position is adjusted in accordance with the accuracy of the absolute position. The determining of the current position may adjust the weight of the estimated absolute position such that the weight of the estimated absolute position is increased if the accuracy of the absolute position is increased and the weight of the estimated absolute position is decreased if the accuracy of the absolute position is decreased. The determining of the current position may adjust the weight of the estimated relative position such that the weight of the estimated relative position is decreased if the accuracy of the absolute position is increased and the weight of the estimated relative position is increased if the accuracy of the absolute position is decreased.

The estimating of the absolute position may estimate the absolute position of the moving node, based on a comparison between the change pattern of the at least one signal strength with a map of a distribution pattern shape of signal strength in a region where the moving node is located, the calculating of the accuracy may calculate similarity between the change pattern of the at least one signal strength and a corresponding pattern in the map as the accuracy of the absolute position, and the determining of the current position may determine the current position of the moving node in such a manner that the weight of the estimated relative position and the weight of the estimated absolute position are adjusted in accordance with the calculated similarity.

The determining of the current position may determine any one of the estimated relative position and the estimated absolute position as the current position of the moving node in accordance with a magnitude of the accuracy of the calculated absolute position.

The estimating of the absolute position may include measuring strength of at least one signal that is transmitted from the at least one fixed node; generating a change pattern of at least one signal strength according to a relative change of a position of a moving node over a plurality of time points from the measured at least one signal strength and the relative position of the estimated moving node; and estimating the absolute position of the moving node, based on a comparison between the change pattern of the generated at least one signal strength and a map of a distribution pattern shape of signal strength in a region where the moving node is located.

The generating of the change pattern of the at least one signal strength may generate the change pattern of the at least one signal strength by accumulating pattern data representing a pattern of at least one signal strength that is received from the at least one fixed node at the estimated relative position, on pattern data with respect to a relative position which is estimated before the relative position is estimated. The generating of the change pattern of the at least one signal strength may generate the pattern data from spatial domain data representing the measured each signal strength in association with the estimated relative position.

According to another aspect of the present invention, there is provided a computer-readable recording medium in which a program for causing a computer to perform the above-described integrated localization method is recorded.

An integrated localization apparatus according to still another aspect of the present invention includes a relative localization unit that estimates a relative position of a moving node, based on motion sensing of the moving node; a wireless localization unit that estimates an absolute position of the moving node, based on a change pattern of at least one signal strength received from at least one fixed node over a plurality of time points; an accuracy calculation unit that calculates accuracy of the absolute position of the moving node which changes along a movement route of the moving node; and a current position determination unit that determines a current position of the moving node from at least one of the estimated relative position and the estimated absolute position in accordance with the accuracy of the calculated absolute position.

The wireless localization unit may include a signal processing unit that measures strength of at least one signal which is transmitted from the at least one fixed node; a pattern generation unit that generates a change pattern of at least one signal strength according to a relative change of a position of a moving node over a plurality of time points from the measured at least one signal strength and the relative position of the estimated moving node; and an absolute position estimation unit that estimates the absolute position of the moving node, based on a comparison between the change pattern of the generated at least one signal strength and a map of a distribution pattern shape of signal strength in a region where the moving node is located.

The integrated localization apparatus may further include a buffer that accumulates pattern data which is generated by the pattern generation unit, and the pattern generation unit may generate the change pattern of the at least one signal strength by accumulating pattern data representing a pattern of at least one signal strength that is received from the at least one fixed node at the estimated relative position on pattern data which is stored in the buffer and storing the accumulated data.

Advantageous Effects

Even in a case where a wireless environment change such as signal interference between communication channels, extension of an access point, and occurrence of a failure or an obstacle, or various route changes such as a case where one road is divided into several branches, a road is suddenly widened or the like, are made, a position of a moving node can be estimated with high accuracy by estimating a relative position of a moving node on the basis of motion sensing of the moving node, estimating an absolute position of the moving node on the basis of a change pattern of at least one signal strength received from at least one fixed node over a plurality of time points, and determining a current position of the moving node from at least one of the relative position and the absolute position estimated in this way in accordance with accuracy of the absolute position of the moving node changing along a movement route of the moving node.

Since the wireless localization technique of related art estimates an absolute position of a moving node using strength of at least one signal currently received, in a case where a signal strength different from strength of a signal collected at the time of building a radio map due to a wireless environment change is measured, there is a very high probability that a current position of the moving node is estimated as another position adjacent thereto rather than an actual position. Meanwhile, since the absolute position of the moving node is estimated by using a change pattern of at least one signal strength according to a relative change of a position of the moving node over a plurality of time points, the present invention is rarely influenced by a wireless environment change, and thereby, a localization error due to the wireless environment change is greatly reduced as compared with the wireless localization technique of related art.

Even in a case where the position of the moving node is estimated by using a radio signal having almost no change in signal strength over a wide area, such as an LTE signal, the absolute position of the moving node is estimated using the change pattern of at least one signal strength according to the relative change of the position of the moving node over the plurality of time points, and thus, the position of the moving node can be accurately estimated. This is because, even if there is almost no change in the signal strength between the adjacent localization points on a movement route of the moving node, strength of the LTE signal sufficiently changes to the extent that the position of the moving node is accurately estimated within a movement distance corresponding to a length of a change pattern of the signal strength used for the wireless localization of the present invention.

As described above, since the position of the moving node can be accurately estimated by using the LTE signal in which the signal strength rarely changes between the measurement points on the movement route, it is possible to provide a wireless localization service that covers an outdoor space and an internal area. As a result, a wireless localization service for a vehicle navigation system or autonomous driving which can perform both an indoor localization and an outdoor localization can be provided, and thereby, it is possible to replace GPS which is most widely used as a vehicle navigation system nowadays but cannot perform the indoor localization.

Particularly, even in a case where a route change, such as a case where one road is divided into several branches or a road is suddenly widened, is made, accuracy of the absolute position of the moving node estimated by using the change pattern of at least one signal received from the fixed node may be lowered. In a case where the accuracy of the absolute position of the moving node is low, the present invention reflects the relative position of the moving node into determination of a current position of the moving node in addition to the absolute position of the moving node, thereby being able to prevent the accuracy of the wireless localization from being lowered due to various route changes. As a result, it is possible to provide a localization service of high accuracy that is very robust against a wireless environment change such as signal interference between communication channels, extension of an access point, or occurrence of a failure or an obstacle, and various route changes such as a case where one road is divided into several branches, a road is suddenly widened, or the like.

The accuracy of the absolute position of the moving node can be quantified by calculating similarity between the change pattern of the signal strength and a corresponding pattern in a map of a distribution pattern shape of signal strength in a region where the moving node is located as accuracy of the absolute position of the moving node estimated by using the change pattern of at least one signal strength received from the fixed node, and thereby, an error of the estimated value of the absolute position of the moving node can be precisely compensated by using a relative position value of the moving node by the amount or errors. As a result, localization accuracy of the integrated localization algorithm according to the present invention can be improved as compared with the integrated localization algorithm of related art. In the integrated localization in which GPS is combined with PDR, and the integrated localization algorithm in which the GPS is combined with the DR of related art, it is difficult to precisely compensate for an error of the GPS because localization accuracy of the GPS is almost impossible to be quantify, and thus, there is a limitation in improving localization accuracy of the integrated localization algorithm.

DESCRIPTION OF THE DRAWINGS

FIGS. 7A and 7B are table forms illustrating accumulation of pattern data used for the wireless localization according to the present embodiment.

FIGS. 9A to 10D are diagrams illustrating examples in which an absolute position of the moving node is estimated in accordance with a wireless localization algorithm according to the present embodiment.

FIGS. 11A and 11B are diagrams illustrating an example in which accuracy of an absolute position estimated by the wireless localization algorithm according to the present embodiment is lowered.

MODE OF THE INVENTION

Hereinafter, embodiments of the present invention will be described in detail with reference to the drawings. Hereinafter, all moving objects, which are localization targets, such as a smartphone carried by a user and a navigation system mounted on a vehicle, will be collectively referred to as a moving node. In addition, communication devices, which are fixedly installed in regions and relay wireless communication of a moving node, such as an access point (AP) of a WiFi network and a base station of an LTE network, will be collectively referred to as a "fixed node". In addition, a radio frequency (RF) signal transmitted from the fixed node will be briefly referred to as a "signal".

An embodiment of the present invention that will be described below relates to localization method and apparatus in which a wireless localization for estimating an absolute position of a moving node based on a radio map using a radio signal such as a WiFi signal or a long term evolution (LTE) signal is integrated with a relative localization for estimating a current relative position of the moving node with respect to a previous position of the moving node, and particularly, to integrated localization method and apparatus of high accuracy which can estimate a position of a moving node of high accuracy even in a case where localization is performed by using a radio signal such as an LTE signal which not only can estimate a position of the moving node of high accuracy even in a change of wireless environment but also has almost no change in signal strength over a wide region and are robust to a route change. Hereinafter, the integrated localization method and wireless localization apparatus will be briefly referred to as an "integrated localization method" and an "integrated localization apparatus".

Figure 1:
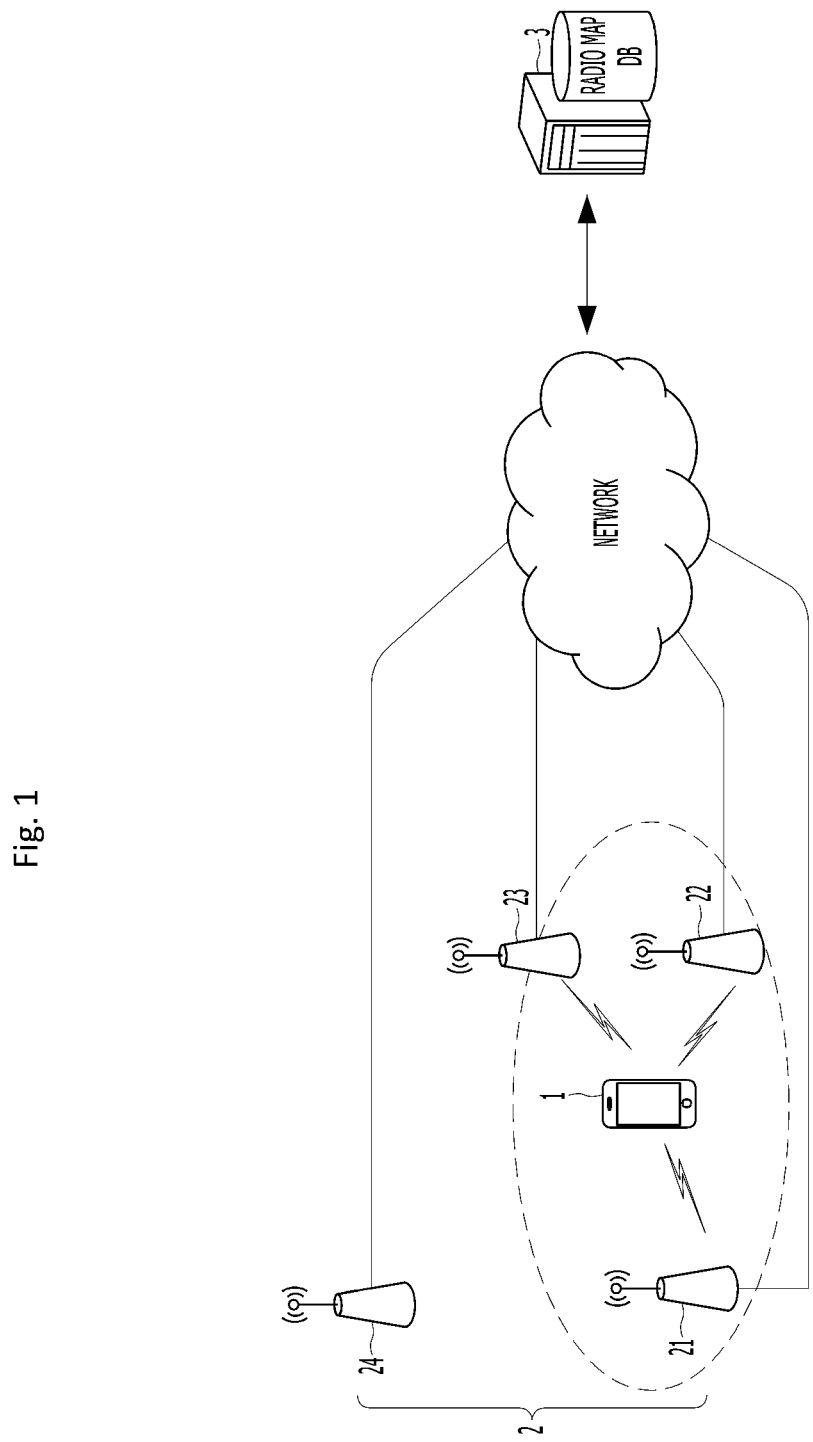
FIG. 1 is a configuration diagram of a wireless communication system according to an embodiment of the present invention.

FIG. 1 is a configuration diagram of a wireless communication system according to an embodiment of the present invention. Referring to FIG. 1, the wireless communication system according to the present embodiment is configured with a plurality of moving nodes 1, a plurality of fixed nodes 2, and a localization server 3. Each of the plurality of moving nodes 1 performs wireless communication with another node through at least one type of wireless communication network while moving in a state of being carried by a user or mounted on a vehicle. In general, each moving node 1 performs wireless communication through at least two types of wireless communication networks, for example, a Wi-Fi network and an LTE network. Each of the plurality of fixed nodes 2 relays the wireless communication of each moving node 1 such that each moving node 1 can access the wireless communication network to perform wireless communication with nodes. In a case where the moving node 1 performs wireless communication through the Wi-Fi network, the fixed node may be an access point, and in a case where the moving node performs the wireless communication through an LTE network, the fixed node may be a base station. The localization server 3 provides each moving node 1 with a part of a radio map necessary for the wireless localization of the present embodiment.

Figure 2:
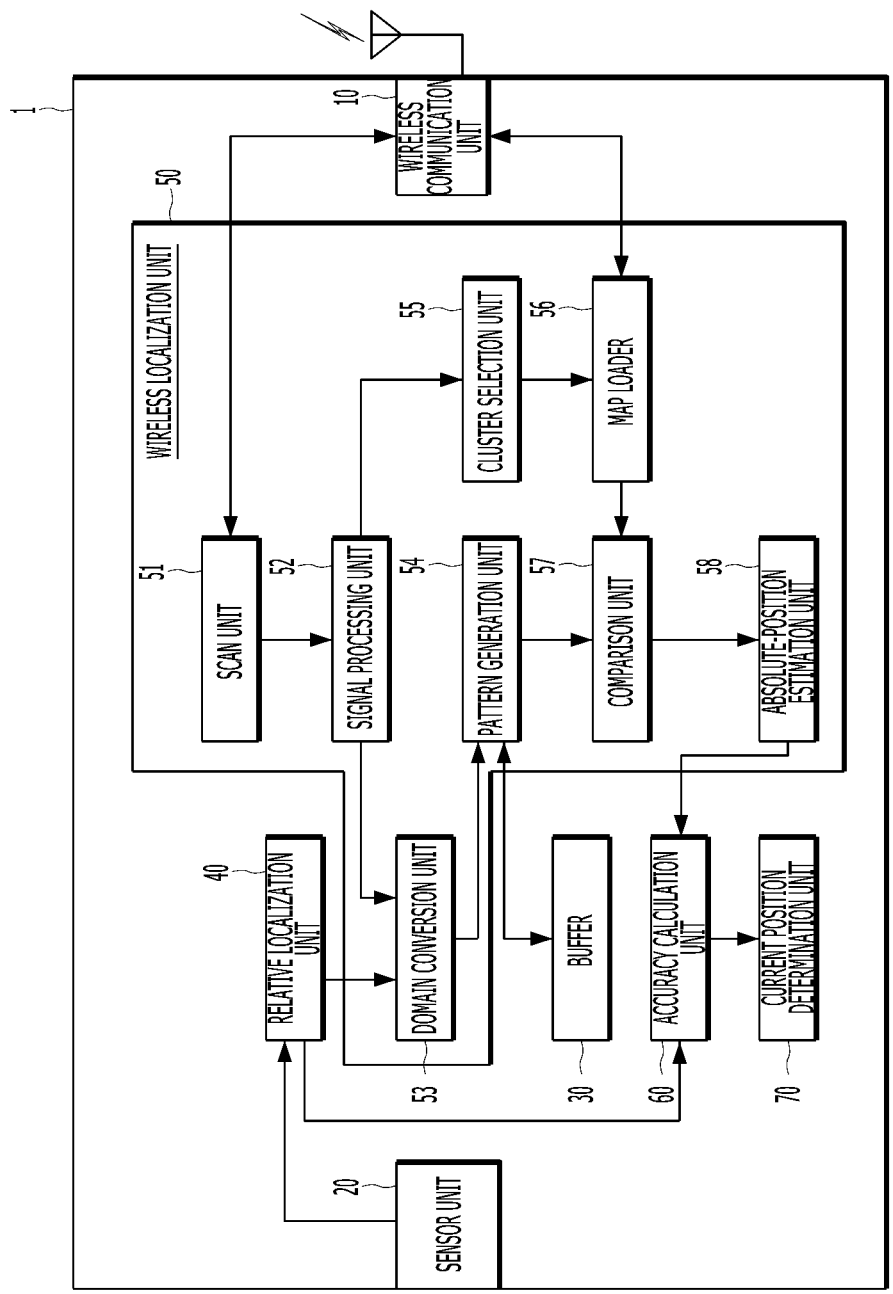
FIG. 2 is a configuration diagram of an integrated localization apparatus of a moving node illustrated in FIG. 1.

FIG. 2 is a configuration diagram of the integrated localization apparatus of the moving node 1 illustrated in FIG. 1. Referring to FIG. 2, the integrated localization apparatus of the moving node 1 illustrated in FIG. 1 includes a wireless communication unit 10, a sensor unit 20, a buffer 30, a relative localization unit 40, a wireless localization unit 50, an accuracy calculation unit 60, and a current position determination unit 70. Those skilled in the art will appreciate that such configuration elements may be realized by hardware which provides a particular function or may be realized by a combination of a memory, a processor, a bus, and the like in which software providing a particular function is stored. Each of the above-described configuration elements is not necessarily realized by separate hardware, and a plurality of the configuration elements may be realized by common hardware, for example, a combination of a processor, a memory, a bus, and the like.

As described above, the moving node 1 may be a smartphone carried by a user or may be a navigation system mounted on a vehicle. The embodiment illustrated in FIG. 2 relates to an integrated localization apparatus, and if other configurations of a smartphone or other configurations of a navigation system are illustrated in FIG. 2 in addition to the configuration of the integrated localization apparatus illustrated in FIG. 2, characteristics of the present embodiment may be degraded, and thus, the other configurations are not illustrated. Those skilled in the art will understand that, in a case where the moving node 1 is realized by the smartphone or the navigation system, other configuration elements besides the configuration elements illustrated in FIG. 2 can be added.

The wireless communication unit 10 transmits and receives signals through at least one wireless communication network. The sensor unit 20 includes at least one sensor which senses movement of the moving node 1. The buffer 30 is used for accumulating pattern data generated by the pattern generation unit 54. The sensor unit 20 may include an acceleration sensor that measures an acceleration of the moving node 1 and a gyro sensor that measures an angular velocity of the moving node 1. A sensor type of the sensor unit 20 may be changed depending on what type of device the moving node 1 is configured. In a case where the moving node 1 is configured by a smartphone, the sensor unit 20 may be configured by an acceleration sensor and a gyro sensor described above. In a case where the moving node 1 is configured by a navigation system mounted on a vehicle, the sensor unit 20 may be configured by the acceleration sensor and the gyro sensor described above, and an encoder, a geomagnetic sensor, and the like may be used instead of the sensors.

The relative localization unit 40 estimates a relative position of the moving node 1 on the basis of motion sensing of the moving node 1 made by the sensor unit 20. The relative localization unit 40 can estimate the relative position of the moving node 1 using a pedestrian dead reckoning (PDR) algorithm or a dead reckoning (DR) algorithm widely known in the art to which the present embodiment belongs. The wireless localization unit 50 estimates the absolute position of the moving node 1 on the basis of a change pattern of at least one signal strength received from at least one fixed node 2 over a plurality of time points. Referring to FIG. 2, the wireless localization unit 50 is configured with a scan unit 51, a signal processing unit 52, a domain conversion unit 53, a pattern generation unit 54, a cluster selection unit 55, a map loader 56, a comparison unit 57, and an absolute-position estimation unit 58.

Figure 3:
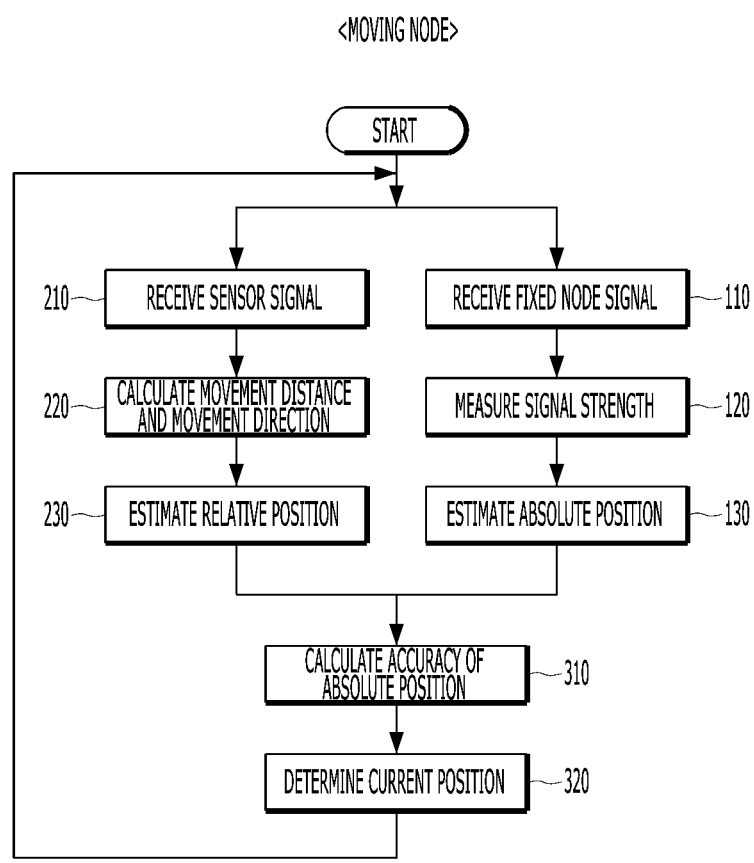
FIG. 3 is a flowchart of an integrated localization method according to an embodiment of the present invention.

FIG. 3 is a flowchart of an integrated localization method according to an embodiment of the present invention. Referring to FIG. 3, the integrated localization method according to the present embodiment is configured by the following steps performed by the integrated localization apparatus of the moving node 1 illustrated in FIG. 2. Hereinafter, the relative localization unit 40 and the wireless localization unit 50 which are illustrated in FIG. 2 will be described in detail with reference to FIG. 3. In step 110, the scan unit 51 of the wireless localization unit 50 of the moving node 1 periodically scans a frequency band of the wireless communication through the wireless communication unit 10, thereby, receiving at least one signal transmitted from at least one fixed node 2. A sampling rate of time domain data which will be described below is determined according to a length of a scan period of the scan unit 51. The shorter the scan period of the wireless communication unit 10, the higher the sampling rate of the time domain data which will be described below, and as a result, precision of an absolute position of the moving node 1 estimated according to the present embodiment can be improved.

If the sampling rate of the time domain data increases, the amount of the time domain data increases, and thereby, a data processing load of the moving node 1 increases, and time required for estimating an absolute position of the moving node 1 can increase. Since a present position has to be provided to a user in real time due to characteristics of wireless localization which is used for the purpose of tracking a position of the user, navigating a vehicle, and the like, it is preferable that the scan period of the wireless communication unit 10 is determined in consideration of a hardware performance of the moving node 1, localization precision required for a field to which the present embodiment is applied, and the like. Since an ID of the fixed node 2 is included in a signal transmitted from a certain fixed node 2, it is possible to know the ID of the fixed node 2 from the signal transmitted from the fixed node 2.

In a case where only one fixed node 2 exists within a communicable range at a current position of the moving node 1, the wireless communication unit 10 receives one signal from one fixed node 2 through a scanning process. In a case where a plurality of fixed nodes 2 exist within the communicable range at the current position of the moving node 1, the wireless communication unit 10 receives a plurality of signals corresponding to the plurality of fixed nodes 2 from the plurality of fixed nodes 2 through the scanning process. FIG. 1 illustrates an example in which the moving node 1 receives three signals from three fixed nodes 21, 22, and 23. It can be seen that the other fixed node 24 is located outside the communicable range of the moving node 1. Since the present embodiment can be applied to a region where a wireless communication infrastructure is relatively well equipped, the moving node 1 mostly receives signals of the plurality of fixed nodes 2, but a signal of one fixed node 2 can also be received at some regions where the wireless communication infrastructure is weak. Meanwhile, in a case where no signal is received in the scanning process, the localization itself according to the present embodiment is impossible, and thereby, the moving node 1 waits until receiving the signal of the fixed node 2.

In step 120, the signal processing unit 52 of the wireless localization unit 50 of the moving node 1 measures strength of each signal received in step 110. In step 130, the wireless localization unit 50 of the moving node 1 estimates the absolute position of the moving node 1 on the basis of a change pattern of at least one signal strength received from at least one fixed node 2 over a plurality of time points. Here, the change pattern of the at least one signal strength received from at least one fixed node 2 over the plurality of time points is a change pattern of at least one signal strength according to a relative change of a position of the moving node 1 over a plurality of time points.

In step 210, the relative localization unit 40 of the moving node 1 periodically receives an output signal of the sensor unit 20. In step 220, the relative localization unit 40 of the moving node 1 calculates a movement distance and a movement direction of the moving node 1 from a value of the output signal of the sensor unit 20 received in step 210. In step 230, the relative localization unit 40 of the moving node 1 calculates a relative change of a current position of the moving node 1 with respect to a previous position of the moving node 1 on the basis of the movement distance and the movement direction of the moving node 1 calculated in step 220, thereby, estimating the current relative position of the moving node 1 with respect to the previous position of the moving node 1. Here, when the integrated localization method according to the present embodiment is first implemented, the previous position of the moving node 1 becomes a reference point of a cluster which will be described below and after the relative position with respect to the reference point is estimated, and after a relative position with respect to the reference point is estimated, the previous position of the moving node 1 becomes a relative position estimated immediately before the relative position to be currently estimated.

As described below, in the process of converting a domain in which a signal strength is represented from a time domain to a spatial domain, the reception time point of each signal is replaced with the relative position of the moving node 1 at the reception time point, and thus, it is preferable that the relative localization unit 40 periodically calculates the relative position of the moving node 1 in synchronization with a scan period of the scan unit 51. In order to increase precision of the relative position of the moving node 1, the relative localization unit 40 may calculate the relative position of the moving node 1 at a period shorter than the scan period of the scan unit 51. As described above, since a sensor type of the sensor unit 20 can be changed depending on what type of device the moving node 1 is configured, different navigation algorithms can be used for estimating the relative position of the moving node 1 depending on what type of device the moving node 1 is configured.

For example, in a case where the moving node 1 is a smartphone, the relative localization unit 40 may estimate the relative position of the moving node 1 using a PDR algorithm. More specifically, the relative localization unit 40 calculates a movement distance of the moving node 1 by integrating a value of an output signal of an acceleration sensor of the sensor unit 20, and can calculate a movement direction in the moving node 1 by integrating a value of an output signal of a gyro sensor in the moving node 1. In a case where the moving node 1 is mounted on a vehicle as a navigation system, the relative localization unit 40 can estimate the relative position of the moving node 1 using a DR algorithm. For example, the relative localization unit 40 can calculate the movement distance and the movement direction of the moving node 1 by attaching the acceleration sensor and the gyro sensor of the sensor unit 20 to a wheel of a vehicle.

When the integrated localization method illustrated in FIG. 3 is implemented again after being executed, the relative localization unit 40 estimates the relative position of the moving node 1 with respect to an absolute position of the moving node 1 estimated in step 130 after estimating the absolute position of the moving node 1 in step 130. Therefore, after a change pattern of at least one signal strength according to a relative change of the position of the moving node 1 over a plurality of points or time is generated, that is, after the plurality of time points, a change pattern of at least one signal strength according to the relative change of the position of the moving node 1 is generated from the relative position of the moving node 1 estimated with respect to the absolute position of the moving node 1. According to the present embodiment, the relative position of the moving node 1 is not continuously estimated on the basis of a previous relative position of the moving node 1, but is estimated on the basis of the absolute position when the relative position of the moving node 1 is replaced with the absolute position, and thus, a section to which estimation of the relative position of the moving node 1 is applied is very short, and thereby, an error of the absolute position of the moving node 1 caused by error accumulation of the relative position due to repeated estimation of the relative position rarely occurs.

As described above, since the PDR and DR algorithms for estimating the relative position of the moving node 1 estimate the relative position of the moving node 1 through integration of the values of the output signals of the sensors, as estimation of the relative position is repeated, errors of the relative position of the moving node 1 are accumulated. Accordingly, the longer the section to which the estimation of the relative position of the moving node 1 is applied, the more the error of the relative position of the moving node 1 increases. In the present embodiment, since the relative position of the moving node 1 is replaced with the absolute position in the middle of the estimation of the relative position of the moving node 1, error accumulation of the relative position due to repeated estimation of the relative position rarely occurs. Accordingly, accuracy of the wireless localization of the present embodiment is very high as compared with a technique in which the relative position estimation algorithm such as the PDR or the DR is combined with a wireless localization technique of related art.

After the absolute position of the moving node 1 is estimated in accordance with the present embodiment, the absolute position may be estimated for each relative position of the moving node 1 estimated thereafter, and one absolute position may be estimated after the relative position of the moving node 1 estimated thereafter is estimated many times. In the former case, after the absolute position of the moving node 1 is estimated, a previous position of the moving node 1 constantly becomes the absolute position estimated immediately before the relative position to be currently estimated. In the latter case, shortly after the absolute position of the moving node 1 is estimated, the previous position of the moving node 1 becomes the absolute position estimated immediately before the relative position to be currently estimated, but thereafter, the previous position of the moving node becomes the relative position estimated immediately before the relative position to be currently estimated until the position is estimated by the above-described number of times.

Figure 4:
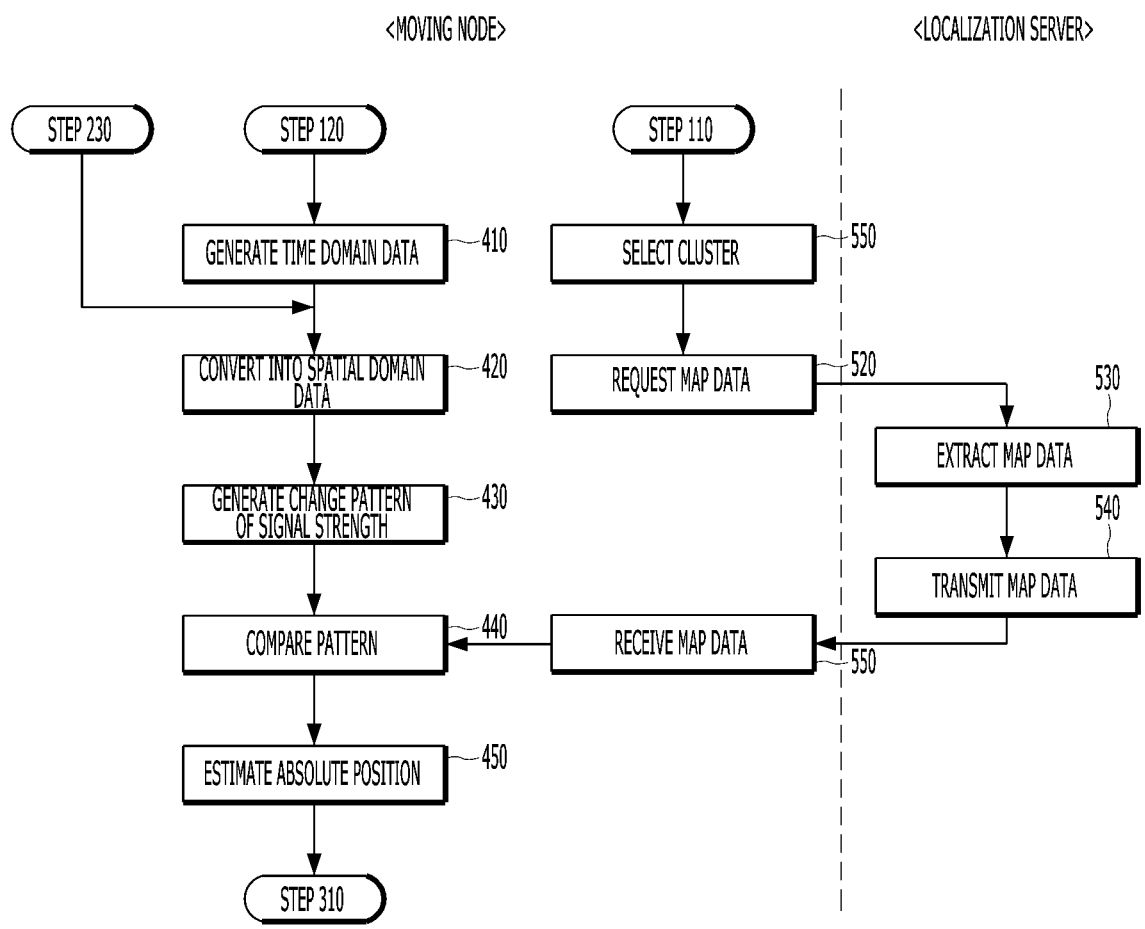
FIG. 4 is a detailed flowchart of step 130 illustrated in FIG. 3.

FIG. 4 is a detailed flowchart of step 130 illustrated in FIG. 3. Referring to FIG. 3. in step 410, the signal processing unit 52 of the wireless localization unit 50 of the moving node 1 generates time domain data representing each signal strength measured in step 120 in association with any one time point. Here, any one time point is used as information for distinguishing the signal received in step 110 from the signal received previously or the signal received thereafter. This time point may be reception time point of each signal. The reception time point of each signal may be a time point when the signal processing unit 52 reads time of an internal timepiece of the moving node 1 at the moment when each signal is input from the wireless communication unit 10.

In more detail, in step 410, the signal processing unit 52 generates time domain data including at least one signal strength set $\{RSS_{mn}, \ldots\}_{TD}$ in which an ID of the fixed node 2 that transmits each signal for each signal received in step 110, a reception time point of each signal, and strength of each signal measured in step 120 are grouped into one set. Here, RSS is an abbreviation of "Received Signal Strength", TD is an abbreviation of "Time Domain", a subscript "m" indicates a sequence number of the ID of the fixed node 2, and "n" indicates a sequence number of the reception time point of each signal.

For example, if the integrated localization method illustrated in FIG. 3 is repeatedly implemented three times, the scan unit 51 scans peripheral signals three times. If the scan unit 51 receives only one signal transmitted from the fixed node 2 having the second ID when scanning a third signal, the time domain data includes only one signal strength set $RSS_{23}$. If the scan unit 51 receives a signal transmitted from the fixed node 2 having the second ID and a signal transmitted from the fixed node 2 having a third ID when scanning the third signal scan, the time domain data includes the signal strength set $RSS_{23}$ and $RSS_{33}$.

In this way, the time domain data can be regarded as data for dividing the strength of each signal measured in step 120 into an ID of the fixed node 2 transmitting each signal in a time domain and a reception time point of each signal. Whenever the integrated localization method according to the present embodiment is implemented, the reception time points of a plurality of signal strength sets $\{RSS_{mn}, \ldots\}_{TD}$ included in the time domain data generated in step 410 are all the same. Accordingly, in order to reduce a length of the time domain data, IDs of a plurality of fixed nodes and a plurality of signal strengths may be arranged and attached to each other at one time point for the singals collected at the same point or time. It will be understood by those skilled in the art that the time domain data can be represented in various formats other than the above-described format.

In step 420, the domain conversion unit 53 of the wireless localization unit 50 of the moving node 1 converts the time domain data generated in step 130 into spatial domain data in which strength of each signal measured in step 120 is represented in association with the relative position of the moving node 1 estimated in step 220. In more detail, the domain conversion unit 53 converts the time domain data into at least one signal strength set $\{RSS_{mn}, \ldots\}_{SD}$ in which IDs of the fixed nodes 2, the relative position of the moving node 1, and the strengths of each signal are grouped into one set by replacing reception time point of each signal with the relative position of the moving node 1 corresponding to the reception time point of each signal, among the IDs of the fixed nodes 2, the reception time point of each signal, and the strength of each signal which is represented by each set $RSS_{mn}$ for each set of at least one signal strength set $\{RSS_{mn}, \ldots\}_{TD}$ included in the time domain data generated in step 130.

Here, RSS is an abbreviation of "Received Signal Strength", SD is an abbreviation of "Space Domain", a subscript "m" represents a sequence number of the IDs of the fixed nodes 2, and "n" represents a sequence number of the relative positions of the moving node 1 corresponding to the sequence number of the reception time points of each signal. In a case where reception of the signal in step 110 and reception of the signal in step 210 are performed at substantially the same time in synchronization with each other, the relative positions of the moving node 1 corresponding to the reception time points of each signal may be the relative positions of the moving node 1 estimated in the reception time points of each signal. In this case, the sequence number of the reception time points of each signal is the sequence number of the relative positions of the moving node 1 as it is. For example, the signal strength set $RSS_{23}$ included in the spatial domain data indicates the strength of a signal received from the fixed node 2 having the second ID when the relative localization unit 40 estimates the third relative position.

If the reception of the signal in step 110 and the reception of the signal in step 210 are not synchronized with each other, the relative position of the moving node 1 corresponding to the reception time point of each signal may be the relative position estimated nearest to the reception time point of each signal among the relative positions estimated in multiple time points. In this manner, the time domain data is time-based data in which the strength of each signal is associated with the reception time point of each signal by grouping the ID of the fixed node 2, the reception time point of each signal, and the strengths of each signal into one set, whereas the spatial domain data is a space-based data in which the strength of each signal is associated with the relative position of the moving node 1 by grouping the ID of the fixed node 2 included in the time domain data, the relative position of the moving node 1 estimated in the time point included in the time domain data, and the strength of each signal included in the time domain data into one set.

Since the reception time points of a plurality of signal strength sets $\{RSS_{mn}, \ldots\}_{TD}$ included in the time domain data generated in step 410 are all the same each time the integrated localization method according to the present embodiment is implemented, the relative positions of the plurality of signal strength sets $\{RSS_{mn}, \ldots\}_{SD}$ included in the spatial domain data converted in step 3420 are all the same each time the integrated localization method is implemented. Accordingly, in order to reduce a length of the spatial domain data, IDs of a plurality of fixed nodes and strengths of a plurality of signals may be arranged and attached to one relative position for the signals collected at the same relative position. It will be understood by those skilled in the art that spatial domain data can be expressed in various formats besides the above-described format.

in step 430, the pattern generation unit 54 of the wireless localization unit 50 of the moving node 1 generates a change pattern of at least one signal strength according to a relative change of the position of the moving node over a plurality of points from the at least one signal strength measured in step 120 and the relative position of the moving node 1 estimated in step 230. In more detail, the pattern generation unit 54 generates a pattern of at least one signal strength currently received in step 110 from at least one signal strength measured in step 120 and the relative position of the moving node 1 estimated in step 230, and successively arranges the pattern of the currently received at least one signal in a pattern of at least one signal received before the reception time point of the signal in step 110, thereby, generating the change pattern of the at least one signal strength according to the relative change of the position of the moving node 1 over a plurality of time points. The integrated localization method according to the present embodiment is a method for repeatedly estimating a current position in real time when the moving node 1 moves through a certain route, and the steps illustrated in FIGS. 3 and 4 are continuously repeated while the integrated localization apparatus illustrated in FIG. 2 is driven.

Figure 5:
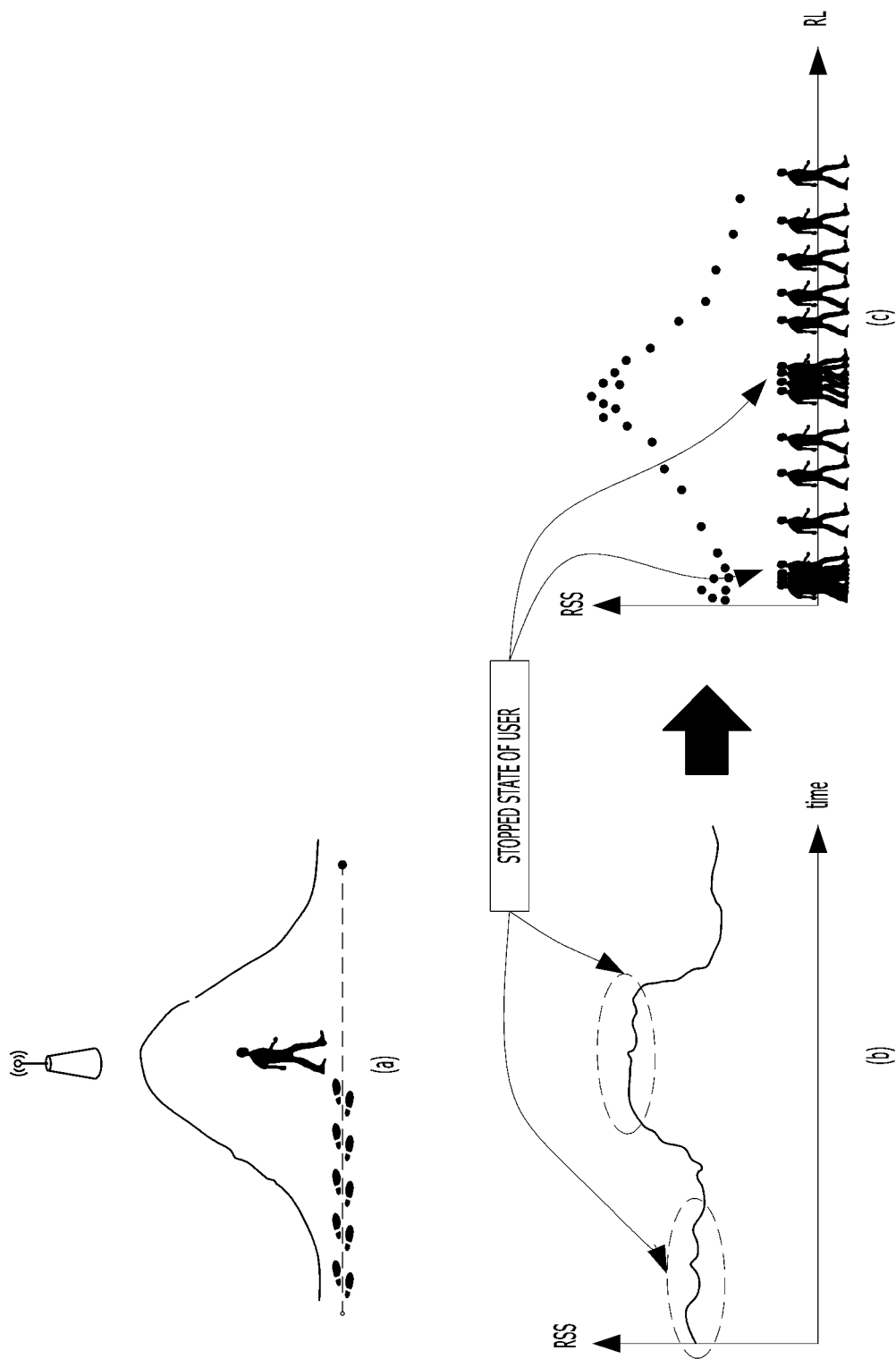
FIG. 5 is a diagram illustrating a pattern formation principle in step 430 of FIG. 4.

FIG. 5 is a diagram illustrating a pattern formation principle in step 430 of FIG. 4. Referring to (a) of FIG. 5, a strength of a signal transmitted from the fixed node 2 is attenuated approximately in inverse proportion to square of a distance from the fixed node 2. In a case where a user approaches and moves away from the fixed node 2, the moving node 1 carried by the user receives a signal having the strength illustrated in (a) of FIG. 5. In general, the user does not constantly walk at a constant speed and may stop temporarily while walking. While the user temporarily stops, even if the integrated localization method illustrated in FIG. 3 is repeatedly implemented many times, the strength of the signal transmitted from the fixed node 2 is measured approximately the same as illustrated in (b) of FIG. 5. The x-axis in (b) of FIG. 5 represents a time point when the signal strength is measured, and the y-axis represents the signal strength. The x-axis in (c) of FIG. 5 represents a relative position (RL) of the moving node 1 and the y-axis represents the signal strength.

Since the strength of the signal transmitted from the fixed node 2 is measured each time the integrated localization method illustrated in FIG. 3 is implemented, the strength of the signal transmitted from the fixed node 2 is not represented in a continuous curve shape as illustrated in (b) of FIG. 5, and is actually represented in a shape in which dots represented at a height corresponding to the strength of the signal are continuously arranged. If a reception point to time of each signal is replaced with the relative position of the moving node 1 by the domain conversion unit 53, change patterns of the signal strength generated by the pattern generation unit 54 are represented as continuous arrangement of the signal strengths received a plurality of times at a plurality of relative positions of the moving node 1 estimated at a plurality of time points as illustrated in (c) of FIG. 5. Accordingly, it can be said that the change pattern of at least one signal strength generated by the pattern generation unit 54 is a change pattern of at least one signal strength represented as continuous arrangement of at least one signal strength received a plurality of times.

A database of the localization server 3 stores a radio map indicating a pattern of distribution of the signal strengths collected in all regions where the integrated localization service according to the present embodiment is provided. When a user repeatedly moves through the same route several times, times necessary for moving the entire route is generally different from each other. In a case where movement routes of a user are the same, even if the times necessary for moving the entire route are different, several positions of the user on the route are the same. Accordingly, reflecting a reception time point of the signal transmitted from the fixed node 2 in the radio map is not only impossible, but also unnecessary. That is, the radio map is represented by a map of a distribution pattern shape of signal strength in which the ID of the fixed node 2 from which a signal is transmitted, an absolute position of a point at which the signal is received, and a strength of the signal are reflected with respect to a large number of signals collected in the entire region where the integrated localization service is provided.

In order to estimate the absolute position of the moving node 1 according to the present embodiment, a pattern that can be matched to the radio map has to be generated. Since localization of the moving node 1 is performed in a state where a position of the moving node 1 is not known, the moving node 1 generates time domain data representing each signal strength in association with a reception time point of each signal, and thereafter, converts the time domain data into spatial domain data in which each signal strength is associated with the relative position of the moving node 1 corresponding to the reception time point of each signal. In order to determine coordinates of the radio map, a region of the real world in which the integrated localization service is provided is divided into a grid structure in which distances between scales are constant. Since a value of the absolute position of a certain point on the radio map is represented by two-dimensional coordinates having a resolution of this unit, it is preferable that the relative position of the moving node 1 is estimated in a state where a pattern generated by the pattern generation unit 15 has resolution equal to or lower than the coordinate resolution of the radio map in multiple proportions if possible.

As illustrated in (c) of FIG. 5, as a user is in a temporarily stopped state, a plurality of dots representing the strength of a plurality of signals received at a plurality of relative positions of the moving node 1 may be concentrated. In this case, if a maximum distance between the plurality of concentrated dots is within a distance corresponding to a coordinate resolution unit of the radio map, that is, a resolution unit of coordinates for representing the relative position of the moving node 1, there is an effect that the plurality of concentrated dots represent one signal strength as one dot, which causes a change pattern of the signal strength to be generated. For example, if the coordinate resolution unit of the radio map is 1 meter, there is an effect that several dots concentrated within one meter represent one signal strength as one dot, which causes a change pattern of the signal strength to be generated.

In step 430, the pattern generation unit 54 generates a pattern of at least one signal strength received from at least one fixed node 2 at a relative position of the moving node 1 estimated in step 230, from the spatial domain data converted in step 420. In step 323, the pattern of at least one signal strength generated by the pattern generation unit 54 is a pattern of at least one signal strength generated by representing at least one signal strength represented by spatial domain data for at least one fixed node represented by the spatial domain data at a relative position represented by the spatial domain data of a movement route of the moving node 1. In step 323, the pattern generation unit 54 generates the pattern of at least one signal strength by generating a signal strength graph representing a signal strength of each signal strength set $RSS_{mn}$ for each signal strength set $RSS_{mn}$ of at least one signal strength set $\{RSS_{mn}, \ldots\}_{SD}$ included in the spatial domain data received in step 310.

Figures 6, 7:
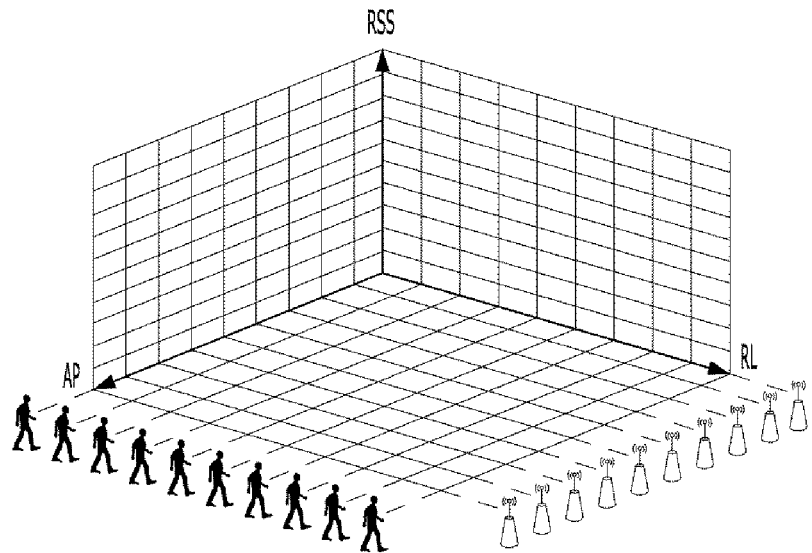
FIG. 6 is a diagram illustrating a three-dimensional spatial coordinate system for generating a change pattern of a signal strength used for a wireless localization according to the present embodiment.

FIG. 6 is a diagram illustrating a three-dimensional spatial coordinate system for generating a change pattern of a signal strength used for the wireless localization of the present embodiment. Referring to FIG. 6, the x-axis of a three-dimensional space is a coordinate axis in which IDs of a plurality of fixed nodes 2 are arranged at a regular interval, the y-axis is a coordinate axis in which a movement route of the moving node 1 is divided into resolution units of coordinates for representing the relative position of the moving node 1, and the z-axis is a coordinate axis in which a measurement range of the strength of a signal received from the plurality of fixed nodes 2 is divided into measurement resolution units of the signal strength. It will be understood by those skilled in the art that information represented by each of the x-axis, the y-axis, and the z-axis of the three-dimensional space can be exchanged with each other. For example, the x-axis may represent the relative position of the moving node 1, and the y-axis may represent the ID of the fixed node 2.

The three-dimensional space coordinate system illustrated in FIG. 6 is based on the assumption that a movement route of a user or a vehicle is determined as in a case of a road in the center of a city, and in a case where a radio map stored in the database of the localization server 3 is built based on collected signals while moving along a route determined as such, a distribution pattern of a signal strength of the radio map which will be described below includes the movement route. That is, in a case where the change pattern of a current signal strength of the moving node 1 coincides with a certain part of the radio map, it is possible to know a point of the movement route where the moving node 1 is located by comparing with the radio map. In a case where the movement route of the moving node 1 is not determined or a height of the moving node 1 is estimated in addition to the position of the moving node 1 on the ground, It may be necessary to generate a change pattern of at least one signal strength received in step 110 for multi-dimensional spatial coordinate system higher than four-dimensional spatial coordinate system.

In order to facilitate understanding of the present embodiment, ten access points corresponding to the fixed node 2 of a Wi-Fi network are arranged in the x-axis of FIG. 6, and users carrying the moving nodes 1 are arranged at a length of 10 meter at intervals of 1 meter. Accordingly, the resolution unit of the relative position coordinates of the moving node 1 is 1 meter. As described below, the change pattern of the signal strength compared with a map represented by map data in step 440 is a three-dimensional pattern generated in the three-dimensional space of a size illustrated in FIG. 6. That is, the size of the three-dimensional space illustrated in FIG. 6 means that a change pattern of signal strength compared with the map represented by the map data is generated at intervals of 10 meters with respect to a route where the moving node 1 moves during the localization according to the present embodiment. At this time, the number of access points on the movement route of the moving node 1 is 10. The three-dimensional space coordinate system illustrated in FIG. 6 is only an example, and the number of access points and the length of the movement route of the moving node 1 may be variously modified and designed.

In step 430, the pattern generation unit 54 generates a graph illustrating the signal strengths of the signal strength set $RSS_{mn}$ in such a manner that a dot is marked on a point of a three-dimensional space determined by mapping an ID of the fixed nodes represented by any one of the signal strength sets $RSS_{mn}$ for each signal strength set $RSS_{mn}$ included in the spatial domain data converted in step 420 on the x-axis of a three-dimensional space, mapping the relative positions of the moving node 1 represented by the strength set $RSS_{mn}$ on the y-axis, and mapping strengths of the signals represented by the signal strength set $RSS_{mn}$ on the z-axis. The signal strength graph is not an image output graph to be shown to a user, but is a graphical element at an intermediate stage for illustrating a process of generating a change pattern of a signal strength in the form of a three-dimensional graph used for wireless localization. However, in order to facilitate understanding of the present embodiment, description will be hereinafter made below by assuming that a signal strength graph for each signal strength set $RSS_{mn}$, a pattern of the signal strength at a relative position, and a change pattern of a signal strength according to a change in the relative position can be visually recognized.

As described above, the pattern of at least one signal strength generated by the pattern generation unit 54 means a pattern of at least one signal strength representing at least one signal strength represented by the spatial domain data in accordance with an ID of at least one fixed node represented by the spatial domain data and a relative position represented by the spatial domain data. Accordingly, if the moving node 1 receives only one signal, the pattern of the signal strength at the relative position of the moving node 1 estimated in step 230 may be one dot shape. If the moving node 1 receives a plurality of signals, the pattern of the signal strength at the relative position of the moving node 1 estimated in step 230 may be a linear line shape or a curved shape represented by a plurality of adjacent dots.

In step 430, the pattern generation unit 54 accumulates pattern data representing the pattern of at least one signal strength generated in this way on the pattern data stored in the buffer 30 and store the accumulated data. The pattern data stored in the buffer 30 is pattern data with respect to a relative position estimated before the relative position is estimated in step 230. The change pattern of at least one signal strength measured in step 120 is generated by accumulating the pattern data. The pattern data necessary for generating the change pattern of the signal strength compared with the map represented by the map data can be accumulated in the buffer 30, and a larger amount of pattern data can be accumulated. In the latter case, the change pattern of the signal strength is generated from a part of the pattern data accumulated in the buffer 30.

FIGS. 7A and 7B are table forms illustrating the accumulation of pattern data used for the wireless localization of the present embodiment. In FIG. 7A, the pattern data accumulated in the buffer 30 is represented in a table form. In step 430, the pattern generation unit 54 may accumulate the spatial domain data in the buffer 30 in the table form of FIG. 7A. In the table of FIG. 7A, a value "m" of "APm" corresponds to coordinate values of the x-axis in a three-dimensional space as a sequence number of IDs of the fixed nodes 2, a value "n" of "RLn" corresponds to coordinate values of the y-axis in the three-dimensional space as a sequence number of relative positions of the moving node 1, and "$RSS_{mn}$" corresponds to coordinate values of z-axis in the three-dimensional space as strengths of signals which are transmitted from the fixed nodes 2 having IDs "APm" and are received at relative positions "RLn" of the moving node 1.

According to the pattern generating method of the pattern generation unit 54 described above, since a dot is represented at a height corresponding to the value "$RSS_{mn}$" at a point of a two-dimensional plane determined by the value "m" of "APm" and the value "n" of "RLn", a set of "$RSS_{mn}$" illustrated in FIG. 7A forms a geometric surface in the three-dimensional space. As described above, in step 430, the pattern generation unit 54 generates a three-dimensional pattern of a geometric surface shape that graphically representing a change of at least one signal strength according to a relative change of a position of the moving node 1 in such a manner that a dot is marked on a point of the three-dimensional space determined by mapping the ID of one fixed node on the x-axis of the three-dimensional space, mapping the relative position of the moving node 1 on the y-axis, and mapping the strength of a signal which is transmitted from the fixed node and is received at the relative position on the z-axis. A plurality of signal strength sets included in the spatial domain data accumulated in the buffer 30 may not accumulate in the buffer 30 in the table form of FIG. 7A and may be accumulated in the buffer 30 in various forms for efficient use of a memory space.

Figure 8:
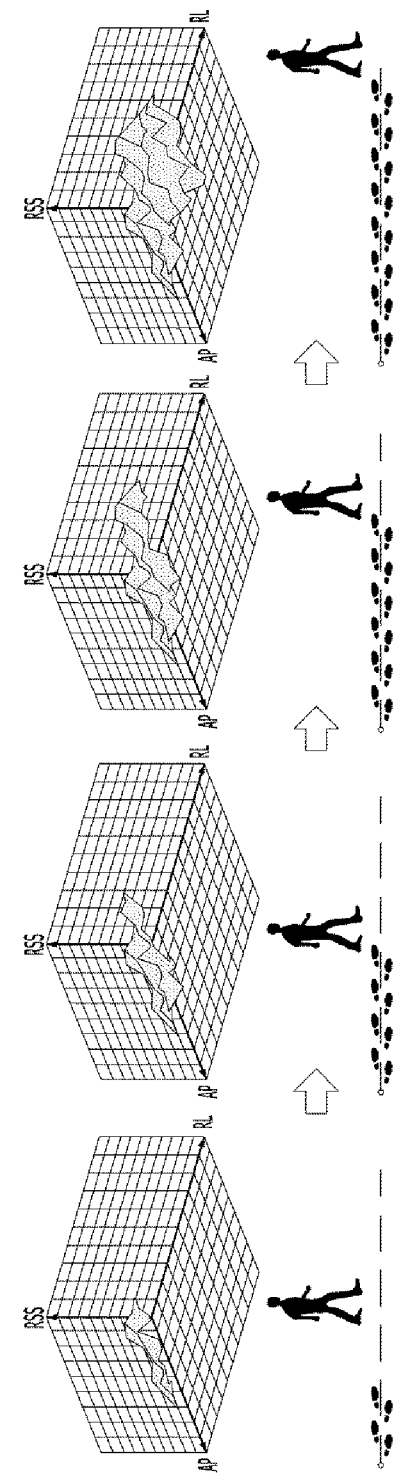
FIG. 8 is a diagram illustrating an example in which the change pattern of the signal strength used for the wireless localization according to the present embodiment is generated.

FIG. 8 is a diagram illustrating an example in which the change pattern of the signal strength used for the wireless localization according to the present embodiment is generated. When a user moves by 20 meters under the assumption that a scale of the three-dimensional space coordinate system illustrated in FIG. 8 is 10 times a scale of the three-dimensional space coordinate system illustrated in FIG. 6, the relative position of the moving node 1 is estimated 20 times and a three-dimensional pattern of a surface shape corresponding to the movement distance is generated by a pattern at each of the 20 relative positions, according to a pattern generation technique of the pattern generation unit 54 described above. A surface illustrated in FIG. 8 is formed by concentrated dots of heights different from each other. It can be seen that, when a user moves 40 meters, 60 meters, and 80 meters, the three-dimensional pattern of the surface shape is expanded by the amount of addition of the movement distance. A curvature of the surface is generated due to a strength difference between signals transmitted from the adjacent fixed nodes 2, that is, a difference between adjacent "$RSS_{mn}$".

In step 510, the cluster selection unit 55 of the wireless localization unit 50 of the moving node 1 selects at least one cluster among the clusters in the entire region where the localization service according to the present embodiment is provided, based on at least one signal received in step 110.

The entire region where the wireless localization service is provided is divided into a plurality of clusters. More specifically, the cluster selection unit 55 selects one cluster in which the moving node 1 is located, based on the ID of at least one fixed node 2 included in at least one signal received in step 110. For example, in a case where a certain fixed node 2 transmits a signal to only a specified cluster, or in a case where a signal of a combination of a plurality of fixed nodes 2 can be received only in a specified cluster, a cluster can be selected only by the ID of at least one fixed node 2.

If the cluster selection unit 55 is not able to select one cluster in which the moving node 1 is located, based on the ID of at least one fixed node 2, the cluster selection unit selects one cluster in which the moving node 1 is located, based on strength of at least one signal received in step 110. For example, in a case where a certain fixed node 2 transmits a signal to two adjacent clusters, or in a case where a signal of a combination of a plurality of fixed nodes 2 can be received in two adjacent clusters, a cluster can be selected based on the strength of at least one signal. The cluster selection unit 55 may select a plurality of clusters by adding a peripheral cluster to the cluster selected as described above. For example, in a case where the moving node 1 is located at a boundary between two adjacent clusters or in a case where accuracy of the wireless localization needs to be improved by increasing the number of clusters, a plurality of clusters may be selected.

In step 520, the map loader 56 of the wireless localization unit 50 of the moving node 1 transmits a signal requesting transmission of map data corresponding to at least one cluster selected in step 510 to the localization server 3 via the wireless communication unit 10. This signal includes data representing at least one cluster selected in step 510. In step 530, if receiving the signal requesting the map data transmitted from the moving node 1, the localization server 3 extracts the map data representing a map of a distribution pattern shape of signal strength of a region corresponding to at least one cluster represented by the request signal, that is, at least one cluster selected in step 510, from the radio map in which distribution data of the signal strength in the entire region where the localization service according to the present embodiment is provided is recorded. The radio map is stored in a database of the localization server 3.

In step 540, the localization server 3 transmits the map data extracted in step 530 to the moving node 1. In step 550, the map loader 56 of the wireless localization unit 50 of the moving node 1 receives the map data transmitted from the localization server 3. For example, the map loader 56 can receive the map data illustrated in FIG. 7B. In the table of FIG. 7B, the value "m" of "APm" is a sequence number of the ID of the fixed node 2 installed in the region of at least one cluster selected in step 510, the value "n" of "ALn" is a sequence number of the absolute value (AL) of the moving node 1, and "$RSS_{mn}$" is the strength of the signal which is transmitted from the fixed node 2 having an ID of "APm" and is received at the absolute position "ALn" of the moving node 1.

Since the pattern data accumulated in the buffer 30 of the moving node 1 and the map data received from the localization server 3 have to match each other, a format of the map data is the same as a format of the pattern data. Accordingly, the description of the pattern data described above will substitute for description of the map data. Since the map data is extracted from the radio map built by generating a database in which strengths of a large number of signals collected from regions where the integrated localization service is provided is stored, the "$RSS_{mn}$" value of FIG. 7B is represented as a specified value. If the moving node 1 includes a database enough to accommodate the radio map stored in the database of the localization server 3, the moving node 1 can extract the map data from the radio map stored in an internal database thereof. In this case, the steps 520, 540, and 550 may be omitted, and the step 530 is performed by the moving node 1.

In step 440, the comparison unit 57 of the wireless localization unit 50 of the moving node 1 compares a change pattern of at least one signal strength generated in step 430 with a map represented by the map data received in step 550, that is, a map of a distribution pattern shape of signal strength in a region where the moving node 1 is located, thereby, searching a part having a pattern most similar to the change pattern of at least one signal strength generated in step 430 within the map represented by the map data. More specifically, the comparison unit 57 compares a three-dimensional pattern of a geometric surface shape graphically representing a change of at least one signal strength generated in step 430 with a map represented by the map data received in step 550, thereby, searching a surface part having a shape most similar to the surface shape of the three-dimensional pattern graphically representing the change of at least one signal strength generated in step 430 within the map represented by the map data received in step 550.

As described above, the present embodiment determines where the change pattern of at least one signal strength generated in step 430 is located within the map represented by the map data received in step 550, based on a surface correlation between the change pattern of at least one signal strength generated in step 430 and the distribution pattern of the signal strength represented by the map data received in step 550. For example, the surface correlation may be calculated by using a three-dimensional shape matching algorithm known to those skilled in the art to which the present embodiment belongs. In step 450, the absolute position estimation unit 58 of the wireless localization unit 50 of the moving node 1 estimates the surface part searched by the comparison in step 440, more specifically, the absolute position of the map represented by the searched surface part, as the absolute position of the moving node 1.

As described above, the present embodiment does not consider only the currently received signal strength like the related art, but estimates the position of the moving node 1 using the change pattern of at least one signal strength according to the relative change of the position of the moving node 1 over the plurality of time points so far unlike the related art, and thereby, if a length of the change pattern of the signal strength is set to be very long, a real-time nature of the localization of the moving node 1 may be degraded. However, a shape similarity between the surface representing the change pattern of the signal strength up to a current position of the moving node 1 and the surface representing the distribution pattern of the signal strength represented by the map data can be rapidly determined by using the three-dimensional shape matching algorithm, and thereby, the real-time nature of the localization of the moving node 1 may be guaranteed even in a case where the length of the change pattern of the signal strength over the plurality of time points is very long.

FIGS. 9 and 10 are diagrams illustrating examples in which the absolute position of the moving node 1 is estimated in accordance with the wireless localization algorithm according to the present embodiment. Scales of the three-dimensional space coordinate system illustrated in FIGS. 9 and 10 are the same as the scale of the three-dimensional space coordinate system illustrated in FIG. 6, and pattern examples based on the relative positions of the moving node 1 illustrated on the left side of FIGS. 9 and 10 are the same as the example illustrated in FIG. 8. Pattern example of based on the absolute positions of maps illustrated on the right side of FIGS. 9 and 10 illustrate maps of the distribution pattern of the signal strength for a movement route up to 100 meters. A map represented by the map data provided by the localization server 3 is much larger than the maps illustrated on the right side of FIGS. 9 and 10, but only a part relating to the matching with the patterns illustrated on the left side of FIGS. 9 and 10 in the map represented by the map data is illustrated on the right side of FIGS. 9 and 10 due to limitation of a size of paper. When a user moves by 20 meters, a three-dimensional pattern of a surface shape illustrated on the left side of FIG. 9A is generated.

According to a matching method based on the surface correlation described above, the comparison unit 57 searchs a boldly-marked part in the pattern map illustrated on the right side of FIG. 9A. Likewise, when a user moves 40 meters, 60 meters, and 80 meters, three-dimensional patterns of a surface shape illustrated on the left sides of FIG. 9B, FIG. 100, and FIG. 10D are sequentially generated. The comparison unit 57 sequentially searchs the boldly-marked parts in the pattern maps illustrated on the right sides of FIG. 9B, FIG. 100, and FIG. 10D. The absolute position estimation unit 58 estimates the relative position estimated in step 230 among a plurality of absolute positions of a part searched in step 440, that is, a plurality of absolute positions of the surface part, that is, the absolute position corresponding to the last estimated relative position, as the absolute position of the moving node 1. A correspondence relationship between the relative position and the absolute position is determined from a shape matching relationship between the two surfaces. That is, the absolute position estimation unit 58 estimates an absolute position of the part having a shape most similar to the shape of the relative position estimated in step 230 among a plurality of absolute positions of the surface part searchedt in step 440, as the absolute position of the moving node 1.

Various wireless localization algorithms including a k-nearest neighbor (KNN) algorithm widely known as a wireless localization technology of related art, a particle filter algorithm, and an algorithm obtained by combining a particle filter and PDR estimate the position of the moving node 1 in common using only the currently received signal strength. In a case where a signal strength different from the signal strength received at the time of building the radio map is measured due to a wireless environment change such as signal interference between communication channels, expansion of an access point, and occurrence of a failure or an obstacle, points adjacent to each other in the radio map have a similar signal strength distribution, and thereby, the wireless localization algorithm of related art has a very high probability that a current position of the moving node 1 is estimated to be an adjacent position other than an actual position thereof. The larger the difference between the strength of the signal received at the time of building the radio map and the strength of the currently received signal, the greater the localization error.

As described above, the wireless localization algorithm according to the present embodiment estimates the position of the moving node 1 using the change pattern of at least one signal strength according to the relative change of the position of the moving node over a plurality of time points, and thereby, an error of the estimated value of the current position of the moving node 1 rarely occurs, even if there occurs a wireless environment change such as signal interference between communication channels, expansion of an access point, and occurrence of a failure or an obstacle. That is, the wireless localization algorithm according to the present embodiment estimates the current position of the moving node 1, based on the change pattern of the signal strength, in consideration of not only the strength of the currently received signal but also all the past signal strengths received in the route where the moving node 1 passes through so far, and thereby, the wireless environment change in the current position of the moving node 1 rarely influences the estimation in the current position of the moving node 1.

The adjacent point of the actual position of the moving node 1, which is estimated when only the strength of the currently received signal is considered due to the wireless environment change according to the wireless localization algorithm of related art, becomes a point deviating from the route represented by the change pattern of the signal strength so far. According to the present embodiment, the wireless environment chant in the position where the moving node 1 is currently located is not able to change the entire change pattern of the signal strength received in the route where the moving node 1 passes through so far, and changes a current time point of such a pattern. Accordingly, if a position of the moving node 1 is estimated by using a change pattern of at least one signal strength according to a relative change of a position of a moving node over a plurality of time points so far, there is a high possibility that an actual position of the moving node 1 is estimated as an absolute position of the moving node 1 rather than an adjacent position of the actual position of the moving node 1 estimated according to the wireless localization algorithm of related art. Of course, if the wireless environment change continuously occurs at various points on a movement route of the moving node 1, a localization error may occur, but this case rarely occurs.

Particularly, a strength of a signal received from a certain fixed node 2 reaches a peak when going around the fixed node, and the peak tends to be rarely influenced by the wireless environment change. Accordingly, if a length of the change pattern of the signal strength used for the wireless localization according to the present embodiment is sufficiently lengthened within a limitation where a real-time nature of the localization is guaranteed such that the currently received signal includes peak parts of various signals on the route where the moving node 1 passes previously although not a part adjacent to the peak, the peak becomes very robust to the wireless environment change. In addition to this, a positional change between the peaks in the change pattern of the signal strength used for the localization according to the present embodiment can be correctly estimated by estimating the relative position of the moving node 1 within a relatively short distance without error accumulation according to the estimation of the relative position, and thereby, accuracy of estimation of a position of the moving node 1 can be greatly improved even in a case where the wireless environment change is severe.

As described above, the change pattern of the signal strength used for the wireless localization according to the present embodiment is a three-dimensional pattern of a geometric surface shape graphically representing a change of at least one signal strength according to a relative change of a position of the moving node 1, and, when viewing from a viewpoint of comparison between a three-dimensional pattern of a surface shape of the moving node 1 and a three-dimensional pattern of a surface shape of map data, the wireless environment change in a current position of the moving node 1 results in a height error only of a surface part corresponding to the strength of the currently received signal, and does not influence most of the surfaces corresponding to points other than a point of the wireless environment change. That is, the wireless environment change in the current position of the moving node 1 does not substantially influence the entire shape of the surface, although causing some deformation of the surface shape.

Since the wireless localization algorithm of related art compares a numerical value of a currently received signal strength with a numerical value of a signal strength distributed in a radio map, it leads to a result that a point adjacent to the actual position of the moving node 1 having a numerical value most similar to the numerical value of the currently received signal strength is wrongly estimated as a position of the moving node 1. According to the wireless localization algorithm according to the present embodiment, the wireless environment change in the current position of the moving node 1 rarely influences the entire shape of the surface, and thereby, when a surface part having the shape most similar to the surface shape of the three-dimensional pattern is searched within the map represented by the map data, there is a very low possibility that a surface part different from the surface part to be originally searched is searched due to an error of a strength of the currently received signal. As described above, the localization error of the algorithm of related art according to the comparison between the numerical value of the currently received signal strength and the numerical value of the signal strength distributed in the radio map can be originally blocked, and thereby, localization accuracy of the moving node 1 can be greatly improved.

Since a base station of an LTE network costs much more than an access point of a Wi-Fi network to install, the base station is installed as far as possible from an adjacent base station so as not to overlap a relay service region thereof. As a result, there are characteristics that LTE signals are uniformly distributed throughout indoor and outdoor spaces, but a region where a change of the signal strength is not large is wide.

As described above, since the wireless localization algorithm of related art estimates a position of the moving node 1 using only the currently received signal strength in common, in a case where there is almost no change in the signal strength between the localization points on a movement route of the moving node 1, not only the localization points cannot be distinguished only by the signal strength, but also the signal strength is very sensitive to peripheral noise, and thereby, a localization error becomes very larger.

Even in a case where a strength of the LTE signal is hardly changed between adjacent localization points on a movement route of the moving node 1, if a length of a change pattern of a signal strength used for the wireless localization of the present embodiment is sufficiently lengthened within a limitation where a real-time nature of localization of the moving node 1 is guaranteed, a strength of the LTE signal is sufficiently changed to the extent that an accurate position estimation of the moving node 1 can be performed within a movement distance corresponding to a length of a change pattern of the signal strength. Accordingly, even in a case where there is almost no change in the strength of the LTE signal between the adjacent localization points on the movement route of the moving node 1, the wireless localization algorithm according to the present embodiment can accurately estimate the position of the moving node 1.

As described above, the wireless localization algorithm according to the present embodiment can accurately estimate a position of the moving node 1 by using an LTE signal with almost no change in a signal strength between measurement points on a movement route, thereby, being able to provide a wireless localization service which can cover both an indoor space and an outdoor space. As a result, the wireless localization algorithm according to the present embodiment can provide a car navigation system or a wireless localization service for autonomous driving which can perform a highly accurate indoor localization and outdoor localization even in the center of a city without being influenced by a skyscraper by using LTE signals widely distributed in the inside of a building and the center of a city, thereby, being replaced with the GPS which is widely used as a car navigation system nowadays but cannot be used for indoor localization and of which localization accuracy is significantly degraded in the center of a city.

In the above, in a case where a WiFi signal and an LTE signal are used, superiority of localization accuracy of the wireless localization algorithm according to the present embodiment is described, but signals that can be used for the wireless localization according to the present embodiment are not limited to this, and the localization according to the wireless localization of the present embodiment can be performed by using strength of a radio signal such as Bluetooth, Zigbee, Lora, or the like.

In step 310, the accuracy calculation unit 60 of the moving node 1 calculates an accuracy of an absolute position of the moving node 1 that changes along a movement route of the moving node 1. The accuracy of the absolute position of the moving node 1 estimated in the step 320 is not constant and constantly changes according to a route change such as branching of the movement route of the moving node 1, a change of wireless environment on the route where the moving node 1 passes, and the like. As described above, the present embodiment estimates the absolute position of the moving node 1 on the basis of a comparison between a change pattern of at least one signal strength generated in step 430 and a map of a distribution pattern shape of signal strength in a region where the moving node 1 is located, the accuracy calculation unit 60 calculates similarity between the change pattern of at least one signal strength generated in step 430 and a corresponding pattern in a map represented by map data as accuracy of the absolute position of the moving node 1. Here, the corresponding pattern in the map is the part having a pattern most similar to the change pattern of at least one signal strength generated in step 430 in the map indicated by the map data.

If the similarity between the change pattern of the signal strength used for the wireless localization of the present embodiment and the corresponding pattern in the map is high, the accuracy of the absolute position of the moving node 1 becomes higher in the present embodiment, and if the similarity between the change pattern of the signal strength used for the wireless localization of the present embodiment and the corresponding pattern in the map is low, the accuracy of the absolute position of the moving node 1 becomes lower. In this way, the accuracy of the absolute position of the moving node 1 estimated by the wireless localization algorithm according to the present embodiment can be quantified. the localization algorithm obtained by combining GPS and PDR, GPS and DR, or the like exists in the past, but the positioning accuracy of GPS is almost impossible to quantify. Due to this, it is difficult to precisely compensate for an error of the GPS, and thus, there is a limitation in improving the localization accuracy of the integrated localization algorithm.

The accuracy of the absolute position of the moving node 1 estimated by the wireless localization algorithm according to the present embodiment can be quantified because being measured by the degree of the similarity between the change pattern of at least one signal strength generated in step 30 and the corresponding pattern in the map represented by the map data, and thereby, an error of the estimated value of the absolute position of the moving node 1 can be precisely compensated by using a relative position value of the moving node 1 by the amount of errors. As a result, the localization accuracy of the integrated localization algorithm according to the present embodiment can be improved as compared with the integrated localization algorithm of related art.

As described above, the present embodiment estimates the absolute position of the moving node 1 by searching, within a map represented by the map data, a surface part having a shape most similar to the surface shape represented by a pattern of a geometric surface shape graphically representing a change of at least one signal strength according to the relative change of the position of the moving node 1. Accordingly, in step 310, the accuracy calculation unit 60 can calculate the accuracy of the absolute position of the moving node 1 by calculating shape similarity between the pattern of the surface shape generated in step 430 and the surface part searched in step 440. Similarity between a certain image and a certain image can be precisely calculated by using an image similarity measurement algorithm well known to those skilled in the art to which the present embodiment belongs. The error of the estimated value of the absolute position of the moving node 1 can be precisely compensated by the amount of precision of the calculated value of the shape similarity between the pattern of the surface shape generated in step 430 and the surface part searched in step 440, and thereby, the localization accuracy of the integrated localization algorithm according to the present embodiment can be greatly improved as compared with the integrated localization algorithm of related art.

FIGS. 11A and 11B are diagrams illustrating an example in which the accuracy of the absolute position estimated by the wireless localization algorithm according to the present embodiment is lowered. FIG. 11A illustrates a map represented by map data received in step 550, and FIG. 11B illustrates an example in which a user moves and reaches a branch point. Referring to FIG. 11A, a physical terrain of the real world is simply represented by a plurality of map links and a plurality of map nodes, in the radio map. A shape of map node is illustrated in which each map link represents a linear path through which a person or a vehicle can pass and each map node represents a point where a plurality of map links meet or a point where one map link is curved. That is, each map node represents a point where a path intersects a path, a point where one path starts to divide into several branches, or a point where a path is curved. In the present embodiment, each map link becomes one cluster. A sequence number of each cluster is represented in each map link.

In step 510, the cluster selection unit 55 can search for a map node around the moving node 1 on the basis of the at least one signal received in step 110 and can select clusters around the map node among clusters in the entire region where the localization service according to the present embodiment is provided. That is, the cluster selection unit 55 can select clusters corresponding to links directly connected to the map node around the moving node 1. For example, in step 510, the cluster selectin unit 55 can select the clusters corresponding to the map links directly connected to the map node located closest to the moving node 1 among the clusters in the entire region where the localization service according to the present embodiment is provided, and can receive map data corresponding to the selected clusters in this way. Accordingly, the present embodiment can measure accurately and efficiently a current position of the moving node 1 without waste of the amount of map data regardless of a direction where the moving node 1 moves.

If a user moves along a route illustrated in FIG. 11B, the user passes through clusters having sequence numbers of 2, 6, 9, 13, and 16. Thereafter, the user arrives at a point branched from the map link of the cluster 16 to several map links of the cluster 20, the cluster 23, and the cluster 22. At this time, the user is in a situation that he has to select one of the three candidate routes at this branch point. The user may turn left from the branch point and proceed to a first candidate route in which the map link of the cluster 16 leads to the map link of the cluster 20, may go straight from the branch point and proceed to a second candidate route in which the map link of the cluster 16 leads to the map link of the cluster 23, and may turn left from this branch point and proceed a third candidate route in which the map link of the cluster 16 to the map link of the cluster 22.

Figure 12:
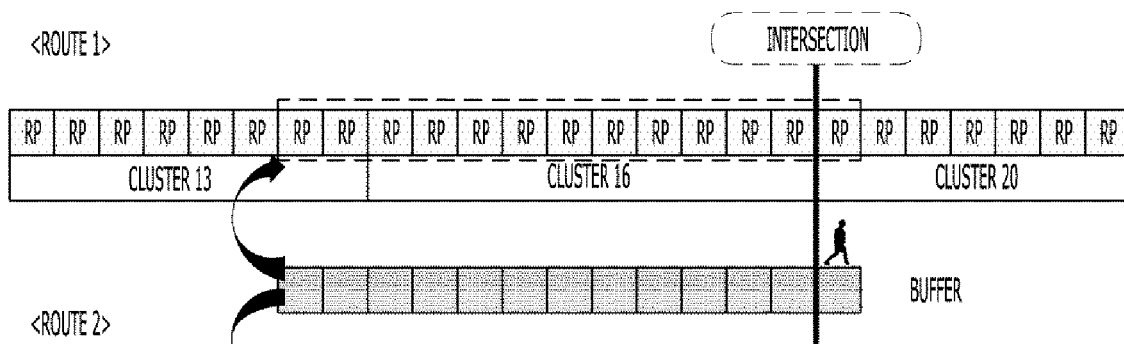
FIG. 12 is a diagram illustrating a cluster set of three candidate routes illustrated in FIGS. 11A and 11B.

FIG. 12 is a diagram illustrating a cluster set of three candidate routes illustrated in FIGS. 11A and 11B. Referring to FIG. 12, the cluster set of the first candidate route is configured by clusters having sequence numbers of 2, 6, 9, 13, 16, and 20. The cluster set of the second candidate route is configured by clusters having sequence numbers of 2, 6, 9, 13, 16, and 23. The cluster set of the third candidate route is configured by clusters having sequence numbers of 2, 6, 9, 13, 16, and 22. From this, it can be seen that remaining clusters except for the last cluster in each of the three candidate routes are identical.

Figure 13:
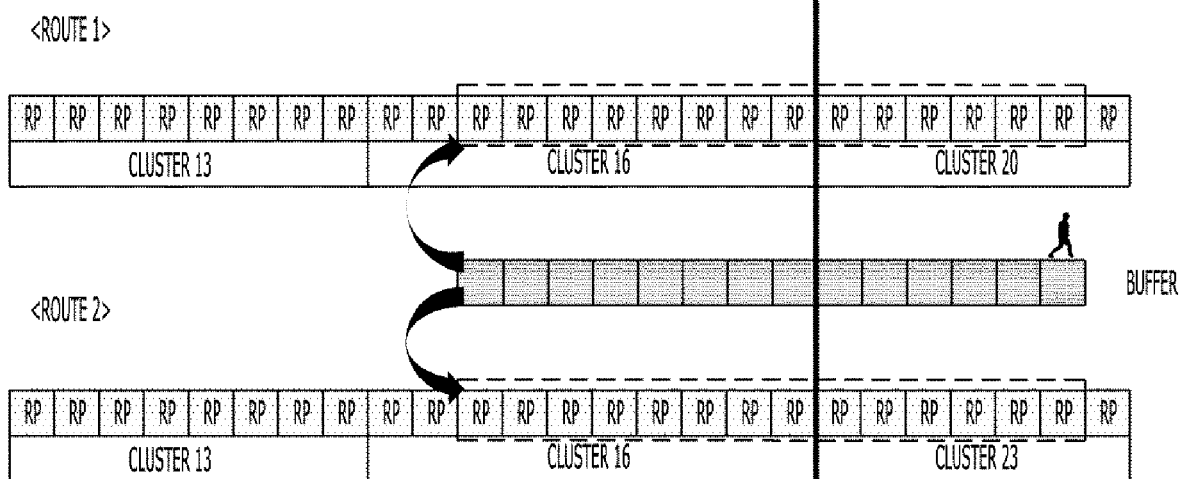
FIG. 13 is a diagram illustrating a comparison between pattern data and map data of a buffer for each cluster set illustrated in FIG. 12.

FIG. 13 is a diagram illustrating a comparison between pattern data and map data of the buffer 30 for each cluster set illustrated in FIG. 12. As illustrated in FIG. 13, a plurality of reference points are distributed in each cluster. Each reference point indicates a point at which an actual coordinate value of a physical terrain is known, and the absolute position of the map data described above can be obtained from the plurality of reference points in each cluster. (a) of FIG. 13 illustrates an example of a comparison between the pattern data and the map data of the buffer 30 when a user is located at the reference point immediately following the branch point. (b) of FIG. 13 illustrates an example of a comparison between the pattern data and the map data of the buffer 30 when the user is located at the sixth reference point from the branch point. (a) and (b) of FIG. 13 illustrates only the first candidate route and the second candidate route such that the comparison between the pattern data and the map data accumulated in the buffer 30 are intuitively represented. It will be understood by those skilled in the art that the third candidate route can also be compared in the same manner. As illustrated in (a) of FIG. 13, when the user is located at the reference point immediately after the branch point, in step 440, the comparison unit 57 compares a change pattern of a signal strength represented by the pattern data accumulated in the buffer 30 and each of distribution patterns of the signal strengths of the three candidate routes in the process of searching the part having a pattern most similar to the change pattern of the signal strength represented by the pattern data accumulated in the buffer 30 within a map represented by the map data. More specifically, the comparison unit 57 compares the change pattern of the signal strength represented by the pattern data accumulated in the buffer 30 with each of the distribution patterns of the signal strengths of the three candidate routes, in the process of searching a surface part having a shape most similar to a surface shape of a three-dimensional pattern graphically representing a change in signal strength represented by the pattern data accumulated in the buffer 30 while searching for the map represented by the map data.

As described above, remaining clusters except for the last cluster are all the same in each cluster set of the first candidate route and the second candidate route. As illustrated in (a) of FIG. 13, if the first candidate route is compared with the second candidate route when a user is located at a reference point immediately after the branch point, only one reference point in the last cluster is different and the remaining reference points are all the same. As a result, a change pattern of a signal strength generated when the moving node 1 moves to the first candidate route and a change pattern of a signal strength generated when the moving node 1 moves to the second candidate route have the same shape except for only an end part corresponding to one reference point. That is, a three-dimensional pattern of the surface shape of the first candidate route and a three-dimensional pattern of the surface shape of the second candidate route have the same shape except for the end part.

Accordingly, in a case where the user actually moves to the first candidate route, there is a possibility in which the wireless localization algorithm according to the present embodiment determines that the change pattern of the signal strength represented by the pattern data accumulated in the change pattern buffer 30 of the signal strength of the second candidate route is more similar to the change pattern of the signal strength of the second candidate route than the change pattern of the signal strength of the first candidate route due to a slight difference of the change pattern of the signal strength between the first candidate route and the second candidate route. As a result, localization accuracy is lowered compared to the route that the user previously passed. Likewise, even in a case where the user actually moves to the second candidate route, there is a possibility in which the wireless localization algorithm according to the present embodiment determines that the change pattern of the signal strength represented by the pattern data accumulated in the buffer 30 is more similar to the change pattern of the signal strength of the first candidate route than the change pattern of the signal strength of the second candidate route.

As illustrated in (b) of FIG. 13, if comparing the first candidate route is compared with the second candidate route when the user is located at the sixth reference point from the branch point, eight reference points in the cluster 16 are the same, but six reference points in the last cluster are different. As a result, the change pattern of the signal strength generated when the moving node 1 moves to the first candidate route and the change pattern of the signal strength generated when the moving node 1 moves to the second candidate route are different from each other in parts corresponding to the six reference points. That is, the three-dimensional pattern of the surface shape of the first candidate route and the three-dimensional pattern of the surface shape of the second candidate route have different shapes in parts corresponding to the six reference points. In this way, a difference of the change pattern of the signal strength between the first candidate route and the second candidate route is significantly larger in the example illustrated in (b) of FIG. 13 than in the example illustrated in (a) of FIG. 13.

Therefore, when the comparison unit 57 searches the part having a pattern most similar to the change pattern of the signal strength represented by the pattern data accumulated in the buffer 30 within the map represented by the map data, There is a high probability of searching a pattern part corresponding to a route on which a user is actually located among the three candidate routes, and as a result, localization accuracy is greatly increased. However, when the user proceeds to any one route of the three candidate routes from a branch point, if the comparison unit 57 erroneously estimates the absolute position of the moving node 1 near the branch point as a certain point on a route other than an actual movement route of the user, the absolute position of the moving node 1 is continuously estimated as points on the route other than the actual movement route of the user until the pattern part corresponding to the route on which the user is actually located is searched in the map.

In step 320, the current position determination unit 70 of the moving node 1 determines a current position of the moving node 1 from at least one of the relative position estimated in step 230 and the absolute position estimated in step 130 in accordance with accuracy of the absolute position of the moving node 1 estimated in step 310. In this way, the present embodiment does not determine constantly the current position of the moving node 1 as the absolute position of the moving node 1 estimated at step 310, but reflects the relative position estimated at the step 230 into the current position determination of the moving node 1 in addition to the absolute position of the moving node 1 in a case where accuracy of the absolute position of the moving node 1 estimated in step 310 is low, and thereby it is possible to prevent accuracy of wireless localization from being lowered due to the fact that the moving node 1 is located at the branch point.

Even in a case where a user moves from a narrow alleyway to a wide square with a smartphone, the user can go through several arbitrary routes out of a single route so far as in a case where the user is located at a branch point, and thereby, accuracy of wireless localization of the present embodiment is lowered. In the present embodiment, in a case where accuracy of the absolute position of the moving node 1 estimated in step 310 is low, the relative position estimated in step 230 in addition to the absolute position of the moving node 1 is reflected into determination of a current position of the moving node 1, and thereby, it is possible to prevent the accuracy of the wireless localization from decreasing caused by the moving node 1 moving from a narrow alleyway to a wide square. As described above, the present embodiment can provide a localization service of high accuracy that is robust against various route changes such as a case where one path is divided into several branches and a case where the path is suddenly widened.

In a very rare case where a wireless environment change such as signal interference between communication channels, extension of an access point, occurrence of a failure or an obstacle influences most of the change pattern of the signal strength accumulated in the buffer 30, the localization accuracy of the wireless localization algorithm according to the present embodiment can be reduced. Even In this case, if the accuracy of the absolute position of the moving node 1 estimated in step 310 is low, the present embodiment reflects the relative position estimated in step 230 in addition to the absolute position of the moving node 1 into the determination of the current position of the moving node 1, and thereby, it is possible to prevent the accuracy of the wireless localization from decreasing even in a case where the change pattern of the signal strength accumulated in the buffer 30 is seriously deformed due to the wireless environment change.

Various route changes such as a case where one path is divided into several branches and a case where the path is suddenly widened, or a wireless environment change such as signal interference between communication channels, expansion of an access point or occurrence of a failure or an obstacle is made usually and occasionally in a very short length on a movement route of the moving node 1, and thus, when the entire movement route of the moving node 1 is viewed, a section where relative localization of the relative localization unit 40 is applied instead of the wireless localization of the wireless localization unit 50 is extremely short. Accordingly, even if the relative localization of the relative localization unit 40 is applied instead of the wireless localization of the wireless localization unit 50 because the accuracy of the absolute position estimated by the wireless localization unit 50 is low, Error accumulation of the relative localization algorithm such as PDR and DR of related art according to continuous estimation of the relative position hardly occurs.

In step 320, the current position determination unit 70 can determine the current position of the moving node 1 using a method of adjusting a weight of the absolute position estimated in step 130 and a weight of the relative position estimated in step 230 in accordance with the accuracy of the absolute position of the moving node 1 estimated in step 310. As described above, the present embodiment adjusts the weight of the absolute position estimated in step 130 and the weight of the relative position estimated in step 230 in accordance with similarity between the change pattern of the signal strength accumulated in the buffer 30 and a corresponding pattern in a map represented by map data, as an accuracy in which the absolute position of the moving node 1 can be quantified, and thereby, it is possible to reflect the relative position estimated in step 230 into determination of the current position of the moving node 1 in correspondence with a change of an localization error of the wireless localization algorithm according to the present embodiment in real time. As a result, the present embodiment can precisely compensate for an error of the absolute position estimated in step 130 using the relative position estimated in step 230, thereby being able to provide a localization service with higher accuracy than the integrated localization algorithm of related art.

For example, in step 320, the current position determination unit 70 can determine the current position of the moving node 1 using a method of adjusting the weight of the absolute position estimated in step 130 and the weight of the relative position estimated in step 230 in accordance with following Equation 1. In Equation 1, "$CL_{value}$" is a coordinate value of the current position of the moving node 1 determined in step 320. Here, "CL" is an abbreviation of the current location (CL) of the moving node 1. "$SC_{value}$" is a coordinate value of the absolute position estimated in step 130, and "$W_1$" is a weight of the absolute position estimated in step 130. Here, "SC" is an abbreviation of surface correlation (SC) used for the wireless localization of the present embodiment. "$\{PDR\}_{value}$" is a coordinate value of the relative position estimated in step 230, and "$W_2$" is a weight of the relative position estimated in step 230. Here, PDR is only an example of a relative localization algorithm, and in a case where the relative position of the moving node 1 is estimated by using another kind of relative localization algorithm such as DR in the present embodiment, a coordinate value of the relative position estimated by another kind of relative localization algorithm such as DR may be applied.

$$CL_{value} = SC_{value} \times W_1 + PDR_{value} \times W_2 \quad \text{Equation 1}$$

Figure 14:
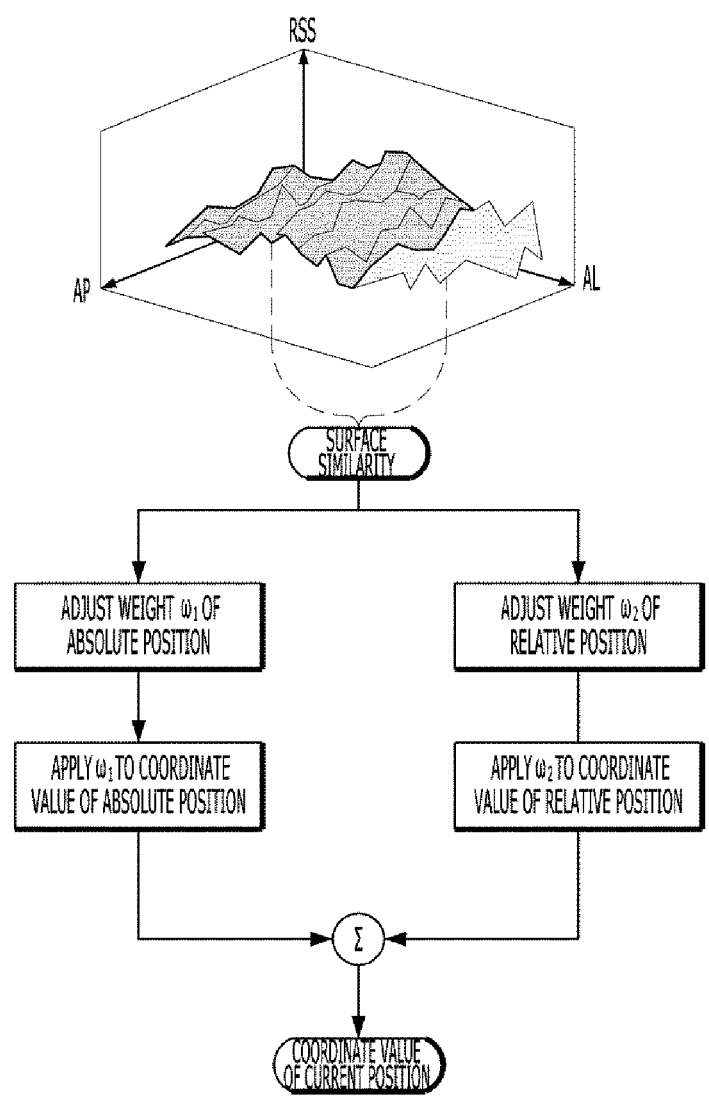
FIG. 14 is a detailed flowchart of step 320 illustrated in FIG. 3.

FIG. 14 is a detailed flowchart of step 320 illustrated in FIG. 3. Referring to FIG. 14, in step 321, the current position determination unit 70 of the moving node 1 adjusts the weight $W_1$ of the absolute position of the moving node 1 such that the weight $W_1$ of the absolute position estimated in step 130 is increased if the accuracy of the absolute position estimated in step 310 is increase and the weight $W_1$ of the absolute position estimated in step 130 decreased if the accuracy of the absolute position estimated in step 310 is decreased. In step 322, the current position determination unit 70 of the moving node 1 adjusts the weight $W_2$ of the relative position of the moving node 1 such that the weight $W_2$ of the relative position estimated in step 230 is decreased if the accuracy of the absolute position estimated in step 310 is increased and the weight $W_2$ of the relative position estimated in step 230 is increased if the accuracy of the absolute position estimated in step 310 is decreased. The sum of the weight $W_1$ of the absolute position and the weight $W_2$ of the relative position is "1" all the time.

For example, in step 321, the current position determination unit 70 can adjust the weight $W_1$ of the absolute position of the moving node 1 such that the weight $W_1$ of the absolute position estimated in step 130 is increased or decreased in proportion to a change of the accuracy of the absolute position estimated in step 310, and can adjust the weight $W_2$ of the relative position of the moving node 1 such that the weight $W_2$ of the relative position estimated in step 230 is increased or decreased in reverse proportion to the change of the accuracy of the absolute position estimated in step 310. In step 321, the current position determination unit 70 can also adjust each of the weight $W_1$ of the absolute value and the weight $W_2$ of the relative position using by a Kalman filter which is widely used to integrate heterogeneous localization algorithms such that the weight $W_1$ of the absolute position and the weight $W_2$ of the relative position are increased or decreased as described above.

A case where the current position determination unit 70 calculates coordinate values of the current position of the moving node 1 by using the Kalman filter to adjust the weight $W_1$ of the absolute position and the weight $W_2$ of the relative position corresponds to a case where one value, that is, a coordinate value of the current position of the moving node 1 is estimated from two independently estimated values, that is, the coordinate value of the absolute position and the coordinate value of the relative position of the moving node 1, and thereby, the current position determination unit 70 can calculate the coordinate value of the current position of the moving node 1 by adjusting covariance of each of the coordinate value of the absolute position and the coordinate value of the relative position of the moving node 1. Since the Kalman filter is a technique widely used to integrate heterogeneous localization algorithms and is a technique well known to those skilled in the art to which the present embodiment belongs, further detailed description will be omitted so as to prevent the characteristics of the present embodiment from being degraded.

In step 321, the current position determination unit 70 can also adjust each of the weight $W_1$ of the absolute position and the weight $W_2$ of the relative position such that one of the relative position estimated in step 130 and the absolute position estimated in step 230 is determined to be a current position of the moving node 1 in accordance with a magnitude of the accuracy of the absolute position calculated in step 310. In this case, the current position determination unit 70 sets one of the weight $W_1$ of the absolute position and the weight $W_2$ of the relative position as "1" and sets the other one as "0" in Equation 1 in accordance with the magnitude of the accuracy of the absolute position calculated in step 310. For example, the current position determination unit 70 sets the weight $W_1$ of the absolute position as "1" and sets the weight $W_2$ of the relative position as "0" if the accuracy of the absolute position calculated in step 310 exceeds reference accuracy. The current position determination unit 70 sets the weight $W_1$ of the absolute position as "0" and sets the weight $W_2$ of the relative position as "1"; if the accuracy of the absolute position calculated in step 310 is less than or equal to the reference accuracy.

Here, the reference accuracy indicates a maximum value in a section of the accuracy of the absolute position which is stochastically proven through several experiments that a coordinate value of the relative position estimated in step 130 is closer to an actual measured coordinate value of a current position of the moving node than a coordinate value of the absolute position estimated in step 230. As described above, in the present embodiment, the weight $W_1$ of the absolute position and the weight $W_2$ of the relative position are set in a very simple manner in accordance with a magnitude of the absolute position calculated in step 310, and thereby, it is possible to greatly reduce a data processing burden of a processor of the integrated localization apparatus according to the present embodiment while slightly reducing the accuracy of the current position of the moving node 1. Accordingly, the integrated localization algorithm according to the present embodiment can be applied to an apparatus having a low-cost processor with low data processing performance.

In step 323, the current position determination unit 70 of the moving node 1 applies the weight $W_1$ of the absolute position adjusted in step 321 to the coordinate value of the absolute position estimated in step 130. For example, in step 323, the current position determination unit 70 can apply the weight $W_1$ of the absolute position adjusted in step 321 to the coordinate value of the absolute position estimated in step 130 by using a method of multiplying the weight $W_1$ of the absolute position adjusted in step 321 by the coordinate value of the absolute position estimated in step 130 in accordance with Equation 1. The weight $W_1$ of the absolute position can also be applied to the coordinate value of the absolute position estimated in step 130 by using a method different from the method of multiplying the weight $W_1$ of the absolute position adjusted in step 321 by the coordinate value of the absolute position estimated in step 130.

In step 324, the current position determination unit 70 of the moving node 1 applies the weight $W_2$ of the relative position adjusted in step 322 to the coordinate value of the relative position estimated in step 230. For example, in step 324, the current position determining unit 70 can apply the weight $W_2$ of the relative position adjusted in step 322 to the coordinate value of the relative position estimated in step 230 by using a method of multiplying the weight $W_2$ of the relative position adjusted in step 322 by the coordinate value of the relative position estimated in step 230 in accordance with Equation 1. The weight $W_2$ of the relative position can also be applied to the coordinate value of the relative position estimated in step 230 by using a method different from the method of multiplying the weight $W_2$ of the relative position adjusted in step 322 by the coordinate value of the relative position estimated in step 230.

In step 325, the current position determination unit 70 of the moving node 1 calculates the coordinate value of the current position of the moving node 1 from the coordinate value of the absolute position to which the weight $W_1$ of the absolute position is applied in step 323 and the coordinate value of the relative position to which the weight $W_2$ of the relative position is applied in step 324. For example, in step 325, the current position determination unit 70 of the moving node 1 can calculate the coordinate value of the current position of the moving node 1 by summing the coordinate value of the absolute position multiplied by the weight $W_1$ of the absolute position in step 323 and the coordinate value of the relative position multiplied by the weight $W_2$ of the relative position in step 324. The coordinate value of the current position of the moving node 1 can also be calculated from the coordinate value of the absolute position to which the weight $W_1$ of the absolute position is applied and the coordinate value of the relative position to which the weight $W_2$ of the relative position by using a method different from the method of summing the coordinate value of the absolute position multiplied by the weight $W_1$ of the absolute position in step 323 and the coordinate value of the relative position multiplied by the weight $W_2$ of the relative position in step 324.

Meanwhile, the integrated localization method according to the embodiment of the present invention described above can be implemented by a program executable in a processor of a computer, and can be implemented by a computer that records the program in a computer-readable recording medium and execute the program. The computer includes any type of computer capable of executing a program, such as a desktop computer, a notebook computer, a smartphone, an embedded type computer, and the like. In addition, a structure of data used for the above-described embodiment according to the present invention can be recorded in a computer-readable recording medium through various means. The computer readable recording medium includes a storage medium such as a RAM, a ROM, a magnetic storage medium (for example, a floppy disk, a hard disk, and the like), and an optically readable medium (for example, a CD ROM, a DVD, and the like).

The present invention is described above with reference to preferred embodiments thereof. It will be understood by those skilled in the art that the present invention may be embodied in various forms without departing from the spirit or essential characteristics thereof. Therefore, the disclosed embodiments should be considered in an illustrative viewpoint rather than a restrictive viewpoint. The scope of the present invention is defined by the appended claims rather than by the above description, and all differences within the scope of equivalents thereof should be construed as being included in the present invention.

The invention claimed is:

1. An integrated localization method comprising:
   estimating a relative position of a moving node, based on motion sensing of the moving node;
   estimating an absolute position of the moving node, based on a change pattern of at least one signal strength received from at least one fixed node over a plurality of time points;
   calculating accuracy of the absolute position of the moving node that changes along a movement route of the moving node; and
   determining a current position of the moving node from at least one of the estimated relative position and the estimated absolute position in accordance with the accuracy of the calculated absolute position,
   wherein the change pattern of the at least one signal strength is a change pattern of at least one signal strength that is represented as continuous arrangement of at least one signal strength which is received a plurality of times at a plurality of relative positions of the moving node that are estimated at the plurality of time points.

2. An integrated localization method comprising:
   estimating a relative position of a moving node, based on motion sensing of the moving node;

estimating an absolute position of the moving node, based on a change pattern of at least one signal strength received from at least one fixed node over a plurality of time points;

calculating accuracy of the absolute position of the moving node that changes along a movement route of the moving node; and determining a current position of the moving node from at least one of the estimated relative position and the estimated absolute position in accordance with the accuracy of the calculated absolute position, wherein the estimating of the absolute position estimates the absolute position of the moving node, based on a comparison between the change pattern of the at least one signal strength with a map of a distribution pattern shape of signal strength in a region where the moving node is located, and wherein the determining of the current position calculates similarity between the change pattern of the at least one signal strength and a corresponding pattern in the map as the accuracy of the absolute position.

3. The integrated localization method of claim 2, wherein the estimating of the absolute position estimates the absolute position of the moving node by searching, within the map, a surface part having a shape most similar to a pattern of a geometric surface shape graphically representing a change of at least one signal strength according to a relative change of a position of the moving node, and wherein the calculating of the accuracy calculates the accuracy of the absolute position by calculating a shape similarity between the pattern of the surface shape and the searched surface part.

4. The integrated localization method of claim 3, wherein the estimating of the absolute position searches a surface part having a shape most similar to the surface shape within the map by comparing the pattern of the surface shape with the map, and estimates an absolute position of the map indicated by the searched surface part as the absolute position of the moving node.

5. The integrated localization method of claim 4, wherein the generating of the change pattern of the at least one signal strength generates the pattern of the geometric surface shape in such a manner that a dot is marked on a point of multidimensional space that is determined by mapping an ID of a certain fixed node on a first coordinate axis of the multidimensional space, mapping the relative position of the moving node on a second coordinate axis, and mapping strength of a signal that is transmitted from the certain fixed node on a third coordinate axis.

6. The integrated localization method of claim 1, wherein the determining of the current position determines the current position of the moving node in such a manner that a weight of the estimated absolute position and a weight of the estimated relative position is adjusted in accordance with the accuracy of the absolute position.

7. The integrated localization method of claim 6, wherein the determining of the current position adjusts the weight of the estimated absolute position such that the weight of the estimated absolute position is increased if the accuracy of the absolute position is increased and the weight of the estimated absolute position is decreased if the accuracy of the absolute position is decreased.

8. The integrated localization method of claim 6, wherein the determining of the current position adjusts the weight of the estimated relative position such that the weight of the estimated relative position is decreased if the accuracy of the absolute position is increased and the weight of the estimated relative position is increased if the accuracy of the absolute position is decreased.

9. The integrated localization method of claim 6, wherein the estimating of the absolute position estimates the absolute position of the moving node, based on a comparison between the change pattern of the at least one signal strength with a map of a distribution pattern shape of signal strength in a region where the moving node is located, wherein the calculating of the accuracy calculates similarity between the change pattern of the at least one signal strength and a corresponding pattern in the map as the accuracy of the absolute position, and wherein the determining of the current position determines the current position of the moving node in such a manner that the weight of the estimated relative position and the weight of the estimated absolute position are adjusted in accordance with the calculated similarity.

10. An integrated localization method comprising:

estimating a relative position of a moving node, based on motion sensing of the moving node;

estimating an absolute position of the moving node, based on a change pattern of at least one signal strength received from at least one fixed node over a plurality of time points;

calculating accuracy of the absolute position of the moving node that changes along a movement route of the moving node; and determining a current position of the moving node from at least one of the estimated relative position and the estimated absolute position in accordance with the accuracy of the calculated absolute position, wherein the determining of the current position determines any one of the estimated relative position and the estimated absolute position as the current position of the moving node in accordance with a magnitude of the accuracy of the calculated absolute position.

11. An integrated localization method comprising:

estimating a relative position of a moving node, based on motion sensing of the moving node;

estimating an absolute position of the moving node, based on a change pattern of at least one signal strength received from at least one fixed node over a plurality of time points;

calculating accuracy of the absolute position of the moving node that changes along a movement route of the moving node; and determining a current position of the moving node from at least one of the estimated relative position and the estimated absolute position in accordance with the accuracy of the calculated absolute position, wherein the estimating of the absolute position comprises:

measuring strength of at least one signal that is transmitted from the at least one fixed node;

generating a change pattern of at least one signal strength according to a relative change of a position of a moving node over a plurality of time points from the measured at least one signal strength and the relative position of the estimated moving node; and estimating the absolute position of the moving node, based on a comparison between the change pattern of the generated at least one signal strength and a map of a distribution pattern shape of signal strength in a region where the moving node is located.

12. The integrated localization method of claim 11, wherein the generating of the change pattern of the at least one signal strength generates the change pattern of the at least one signal strength by accumulating pattern data representing a pattern of at least one signal strength that is received from the at least one fixed node at the estimated relative position, on pattern data with respect to a relative position which is estimated before the relative position is estimated.

13. The integrated localization method of claim 12, wherein the generating of the change pattern of the at least one signal strength generates the pattern data from spatial domain data representing the measured each signal strength in association with the estimated relative position.

14. A non-transitory computer-readable recording medium comprising:
   a program for causing a computer to perform the method of claim 1.

15. An integrated localization apparatus comprising:
   a relative localization unit that estimates a relative position of a moving node, based on motion sensing of the moving node;
   a wireless localization unit that estimates an absolute position of the moving node, based on a change pattern of at least one signal strength received from at least one fixed node over a plurality of time points;
   an accuracy calculation unit that calculates accuracy of the absolute position of the moving node which changes along a movement route of the moving node; and
   a current position determination unit that determines a current position of the moving node from at least one of the estimated relative position and the estimated absolute position in accordance with the accuracy of the calculated absolute position,
   wherein the change pattern of the at least one signal strength is a change pattern of at least one signal strength that is represented as continuous arrangement of at least one signal strength which is received a plurality of times at a plurality of relative positions of the moving node that are estimated at the plurality of time points.

16. The integrated localization apparatus of claim 15, wherein the wireless localization unit includes,
   a signal processing unit that measures strength of at least one signal which is transmitted from the at least one fixed node;
   a pattern generation unit that generates a change pattern of at least one signal strength depending on a relative change of a position of a moving node over a plurality of points of time from the measured at least one signal strength and the relative position of the estimated moving node; and
   an absolute position estimation unit that estimates the absolute position of the moving node, based on a comparison between the change pattern of the generated at least one signal strength and a map of a distribution pattern shape of signal strength in a region where the moving node is located.

17. The integrated localization apparatus of claim 16, further comprising:
   a buffer that accumulates pattern data which is generated by the pattern generation unit,
   wherein the pattern generation unit generates the change pattern of the at least one signal strength by accumulating pattern data representing a pattern of at least one signal strength that is received from the at least one fixed node at the estimated relative position on pattern data which is stored in the buffer and storing the accumulated data.

* * * * *